(12) United States Patent
Lehman et al.

(10) Patent No.: US 6,282,184 B1
(45) Date of Patent: Aug. 28, 2001

(54) COMMON DIGITIZING RATE FOR MULTIPLE AIR INTERFACES FOR GENERIC CELL SITES IN CELLULAR RADIO

(75) Inventors: Brian James Lehman; Bradley John Morris, both of Ottawa; Gilles Monette, Gatineau; Blaine Geddes, Kemptville, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/996,133

(22) Filed: Dec. 22, 1997

(51) Int. Cl.[7] .................................................. H04J 1/00
(52) U.S. Cl. ..................... 370/342; 370/278; 370/282; 375/219; 375/316
(58) Field of Search ................... 370/278, 282, 370/290, 315, 320, 321, 342, 347, 441, 442, 501; 375/146, 147, 211, 219, 295, 316, 345; 455/422, 426, 522, 523

(56) References Cited

U.S. PATENT DOCUMENTS

| 5,490,172 | * | 2/1996 | Komara | 375/296 |
| 5,537,435 | | 7/1996 | Carney et al. | 375/219 |
| 5,592,480 | | 1/1997 | Carney et al. | 370/347 |
| 5,999,573 | * | 12/1999 | Zangi | 375/216 |

* cited by examiner

Primary Examiner—Wellington Chin
Assistant Examiner—Frank Duong
(74) Attorney, Agent, or Firm—Dennis R. Haszke; Smart & Biggar

(57) ABSTRACT

A basestation transceiver simultaneously addressing multiple air interface standards with cost-effective and efficient allocation of the resources available at the transceiver. The invention significantly reduces the redundancy of the radio frequency equipment used in the transceiver by the use of a common digitizing rate selected to simultaneously accomodate all of the air interface protocols serviced.

12 Claims, 12 Drawing Sheets

COMMON DIGITIZING RATE FOR MULTIPLE AIR INTERFACES FOR GENERIC CELL SITES IN CELLULAR RADIO

FIELD OF THE INVENTION

This invention relates generally to communication networks, and in particular to a wireless communication system basestation based on a generic cell site architecture providing support to multiple air interface standards such as CDMA (code division multiplex access), TDMA (time division multiplex access) and GSM (groupe special mobile).

BACKGROUND ART

Historically, basestations used for wireless communications were designed to support a single air interface standard, for example AMPS (advanced mobile phone service), as the limited selection of air interface standards available in the cellular communications industry did not necessitate the use of more versatile basestations. More recently however, the emergence of several new air interface standards such as CDMA, TDMA and GSM made it desirable for a basestation to provide support to multiple air interface standards. To do this, the conventional approach consisted of providing designated signal processing equipment for each air interface standard to be serviced. The variety of signal processing functionality requirements of current cellular installations such as those used for PCS (personal communication system) operations which address a variety of air interface protocols do not permit a cost-effective and efficient allocation of the resources present at the basestation. Concurrent support of several air interfaces requires the duplication of wideband digital receivers and transmitters, A-D (analog-to-digital) and D-A (digital-to-analog) converters and signal processing equipment for each air standard serviced. The accommodation of several air interface standards necessitates replicating some of the apparatus used in both the receive and transmit directions for each additional air interface protocol sought to be supported by the basestation. The equipment unique to each protocol typically includes two sets of DSP (digital signal processing) units, an RX (receive) channelizer bank, a TX (transmit) channelizer bank, an RF front end which has a wideband receiver, a wideband transmitter and a pair of A-D (analog-to-digital) and D-A (digital-to-analog) converters as is well known in the art. However, duplicating this equipment for each air interface standard and more particularly the RF front end may very rapidly prove to have a major impact on the overall cost of the transceiver.

In addition to the need to reduce the cost of the transceiver, it would also be desirable to make the RF front end simple and more portable. This is due to the fact that some wireless service providers require the RF equipment to be remotely mounted on the antenna tower used for transmission with the remainder of the basestation installed on the ground so as to minimize losses between the antenna and the RF equipment.

In view of the possible remoteness of the RF front end section from the remainder of the basestation, the RF front end should be designed in a portable fashion to eliminate the need to install additional or different expensive and bulky RF equipment when different types of wireless signalling must be accommodated.

The need to address the multiple signalling protocols defined by the various air interface standards has also triggered the emergence of what is now known in the wireless industry as the software radio. A software radio is a highly desirable GCS (generic cell site) architecture for use in PCS installations. It consists of a single configurable basestation hardware design with signal processing equipment that can address several air interface standards. The particular features of interest of a software radio include software configurable wideband reception and transmission capabilities. These characteristics enable the software radio to handle multiple channels from various air interface standards. However, this software configurability does not allow multiple standards to be serviced simultaneously, instead allowing them to be serviced only in sequence.

U.S. Pat. No. 5,537,435 which issued Jul. 16, 1996 to Carney et al. and entitled "Transceiver Apparatus Employing Wideband FFT Channelizer With Output Sample Timing Adjustment And Inverse FFT Combiner For Multichannel Communication Network" discloses a multichannel wireless communication transceiver architecture for wideband signal processing. This patent discloses, among other things, the use of rational rate conversion techniques in an FFT-based wideband channelizer to provide optimum sampling of each digital channel signal output fed to the processing units. The transceiver architecture described in this patent uses a pair of oscillators from which a unique sampling rate for the A-D converter is selected according to the sampling requirements of the particular air interface standard serviced by the transceiver. In particular, the oscillators are provided to respectively accommodate TDMA or CDMA signal processing but the disclosure makes it clear that these two air interface protocols cannot be serviced simultaneously. The oscillators are merely provided to make the basestation more versatile in that it can selectively be configured to either process TDMA or CDMA signals.

U.S. Pat. No. 5,592,480 which issued Jan. 7, 1997 also to Carney and al. and entitled "Wideband Wireless Basestation Making Use of Time Division Multiple-Access Bus Having Selectable Number of Time Slots and Frame Synchronization to Support Different Modulation Standards" partially addresses the redundancy problem outlined above by the use of a TDM (time division multiplexing) bus for providing digital samples of a number of wireless communication channels. This TDM bus is claimed to efficiently service TDMA and CDMA standards simultaneously with a dynamic allocation of signal processing resources therefore eliminating the need to designate or install additional processing units for each air interface standard serviced. However, there is no solution provided for the increase in complexity in the RF front end (see FIG. 9 for example). Separate wideband digital tuners and exciters are required for each different air interface standard supported by the basestation.

Accordingly, there is a need for a cost-effective, simpler and more portable RF front end that can simultaneously service multiple air interface standards.

SUMMARY OF THE INVENTION

It is an object of the present invention to obviate or mitigate one or more of the above- identified disadvantages.

According to a first broad aspect, this invention provides a receive section for a multichannel wireless communication system for processing a composite RF (radio frequency) signal containing RF signals each having an RF bandwidth associated with a respective air interface standard, the receive section comprising a first antenna for receiving the composite RF signal, a wideband receiver connected to the first antenna for down-converting the composite RF signal to produce a down-converted signal, an A-D (analog-to-digital) converter connected to the wideband receiver for performing an analog-to-digital conversion on the down-converted signal to produce a first composite digital signal at a common digitizing rate, for each particular air interface standard: a) an associated RX (receive) channelizer bank connected to receive the first composite digital signal from the A-D converter for adjusting the first composite digital signal data rate to a corresponding standard DSP (digital signal processing) data rate specified by the associated air interface standard to produce a respective adjusted composite digital signal and for extracting from the respective adjusted composite digital signal a respective set of channelized digital signals and b) a first set of DSP units connected to the RX channelizer bank for digitally processing and demodulating the corresponding set of channelized digital signals to produce a first set of digital channel signals each having an associated channel bandwidth corresponding to the particular air interface standard.

According to a second broad aspect, the invention provides a transmit section for a multichannel wireless communication system for processing multiple sets of digital channel signals, each set of digital channel signals being associated with a respective air interface standard, the transmit section comprising, for each particular air interface standard: a) a set of DSP units each connected to receive the corresponding set of digital channel signals for providing a respective set of digitally processed and modulated channel signals, b)an associated TX (transmit) channelizer bank connected to receive the corresponding set of digitally processed and modulated channel signals, the TX channelizer banks being respectively operative to adjust the data rate of each digitally processed and modulated channel signal received to the common digitizing rate for collectively producing a composite digital signal at the common digitizing rate which is representative of the digitally processed and modulated channel signals, a D-A (digital-to-analog) converter connected to receive the composite digital signal for performing a digital-to-analog conversion on the composite digital signal at the common digitizing rate to produce a composite analog signal, the transmit section further comprising a wideband transmitter connected to the D-A converter for up-converting the composite analog signal to produce an up-converted signal and an antenna for transmitting the up-converted signal.

In particular, the invention provides a basestation transceiver which simultaneously addresses multiple air interface standards with cost-effective and efficient allocation of the resources present at the transceiver and significantly reduces redundancy in the RF equipment used.

The RF front end includes RF transmit and receive sections. The receive section designed in accordance with this invention is configured to over-sample a selected band of RF energy large enough to contain the contents of the signals employed in any of the air interface standards supported in the band. A preferred embodiment of the present invention supports J-STD-008 CDMA, IS-136A TDMA and J-STD-007A GSM standards which necessitates the sampling of a 15 MHz band located in the 1850 MHz to 1910 MHz frequency spectrum allocated for US PCS (United States Personal Communication System) uplink operations. The receive section includes a receive antenna, a single wideband receiver coupled to a single A-D converter with a common digitizing rate calculated to simultaneously accommodate all of the air interface protocols serviced. The A-D converter is coupled to a plurality of RX channelizer banks with a high speed optical link. A plurality of rate adjustment components selected from the group of decimators, rational rate converters and interpolators is used in each RX channelizer bank to convert the incoming digitized signal generated by the A-D converter at the common digitizing rate into a digitized signal having the appropriate rate for a particular air interface standard. Each RX channelizer bank is responsible for tuning the digitized signal to be located in the frequency band specified by a particular air interface protocol, separating the digitized signal into the channel bandwidths specified by the same air interface protocol and suppling the channelized digital signals to a set of baseband DSP units for further processing and demodulation to produce a respective set of digital channel signals in a form suited for distribution to the remainder of the telephony network, which may for example include a PSTN (public switching telephone network).

On the transmit side, baseband DSP units are designated to modulate and process digital channel signals received from the telephony network. The baseband DSP units used in association with each air interface protocol are coupled to a corresponding TX channelizer bank which functions to filter and tune the frequency spectrum of the digitally processed and modulated channel signals received in the frequency band used for transmit operations and also operates to adjust their respective data rate to the common digitizing rate. The TX channelizer banks are interconnected in cascade for combining the digitally processed and modulated channel signals into a composite digital signal. This composite digital signal is routed via a high speed optical link to the transmit section of the RF front end which includes a single D-A converter and a single wideband transmitter coupled to a transmit antenna. The D-A converter and the wideband transmitter operate to convert the composite digital signal received from the TX channelizer banks into an analog form and upconvert the resulting signal to the desired radio frequency range before transmitting them via the transmit antenna. A preferred embodiment of the present invention adjusts and combines CDMA, TDMA and GSM digital channel signals in respective CDMA, TDMA and GSM TX channelizer banks, upconverts and transmits these signals in the form of a composite signal in a 5 MHz band located in the 1930 MHz to 1990 MHz frequency range allocated for US PCS downlink operations.

The use of a common digitizing rate in the transceiver eliminates the current practice of duplicating the equipment used in the radio frequency front end section of a transceiver for each air interface protocol serviced. As a result, a transceiver of the present invention provides efficient and cost-effective simultaneous support to a variety of air interface standards.

Yet another advantage of this invention is the resulting reduction in complexity in the RF front end. This makes it portable enough to be conveniently installed at a remote location such as, for example, an RF tower while the remaining portion of the transceiver apparatus is kept on the ground.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
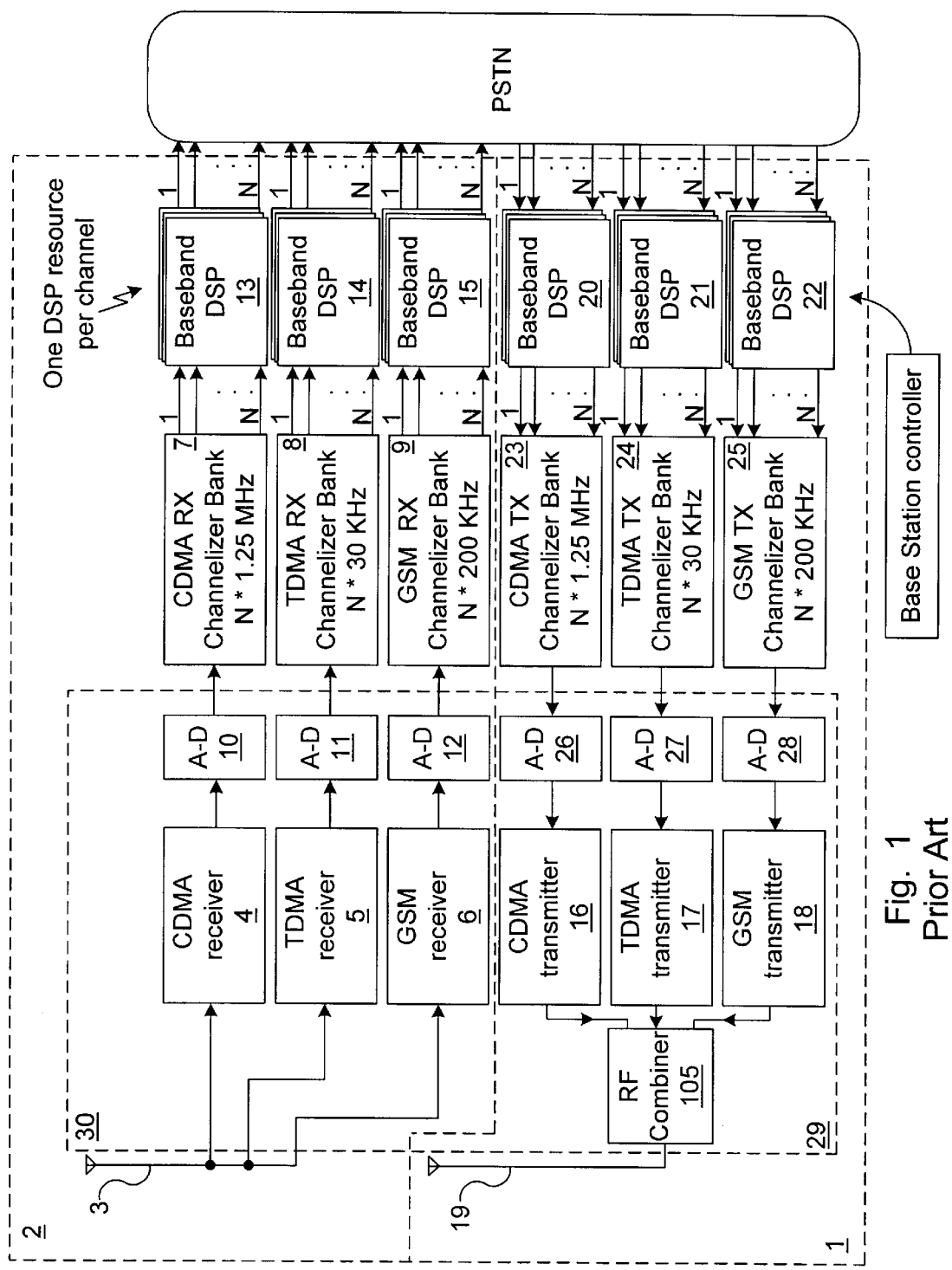
FIG. 1 is a block diagram of a transceiver portion of a conventional basestation which can support multiple air interface standards.

Referring firstly to FIG. 1, a conventional transceiver portion of a basestation that can service multiple air interface standards such as CDMA, TDMA and GSM comprises a receive section generally indicated by 2 and a transmit section generally indicated by 1. The receive section 2 has a receive antenna 3 coupled to a CDMA wideband receiver 4, a TDMA wideband receiver 5 and a GSM wideband receiver 6 which are, in turn, respectively coupled to A-D converters 10, 11, 12. Wideband receivers 4, 5, 6 and A-D converters 10, 11, 12 form the RF front end receive section generally indicated by 30. The A-D converters 10, 11, 12 are respectively connected to a CDMA RX (receive) channelizer bank 7, a TDMA RX channelizer bank 8 and a GSM RX channelizer bank 9. Each RX channelizer bank 7, 8, 9 produces a plurality N of channelized digital signals and is coupled to a corresponding set of baseband DSP units 13, 14, 15.

In operation, the wideband receivers 4, 5, 6 of the RF front end receive section 30 all function in a similar fashion, respectively downconverting a selected band of the RF energy collected by the receive antenna 3. Next, the wideband receivers 4, 5, 6 forward the downconverted signals to respective CDMA, TDMA and GSM RX channelizer banks 7, 8, 9 through the corresponding A-D converters 10, 11, 12, each with a sampling rate clock signal of a sufficiently high frequency to accommodate the total bandwidth associated with their respective air interface standard. RX channelizer banks 7, 8, 9 are all configured to separate the received digital signal into a plurality N of channelized digital signals, each respectively with, for example, a channel bandwidth of 1.25 MHz for CDMA, 30 kHz for TDMA and 200 KHz for GSM. The channelized data respectively generated by each RX channelizer bank 7, 8, 9 is then routed to the corresponding set of baseband DSP units 13, 14, 15 for further processing and demodulation to produce a respective set of digital channel signals in a form suited for further processing and distribution to the PSTN by the basestation.

Similarly, the transmit section 1 of the conventional transceiver illustrated in FIG. 1 has a plurality of sets of baseband DSP units 20, 21, 22, with each DSP unit coupled to the telephony network to receive ones of a plurality of digital channel signals. These sets of DSP units 20, 21, 22 are connected to a respective CDMA, TDMA and GSM TX (transmit) channelizer bank 23, 24, 25, followed by a D-A converter 26, 27, 28. The D-A converters 26, 27, 28 are respectively coupled to corresponding wideband CDMA, TMDA and GSM transmitters 16, 17, 18 which are connected to an RF combiner 105 to form the RF front end transmit section generally indicated by 29. The RF combiner 105 is coupled to a transmit antenna 19.

In function, the sets of baseband DSP units 20, 21, 22 are coupled to receive from the telephony network respective ones of a plurality of digital channel signals to be modulated over different narrowband frequency channels and processed in accordance with the characteristics of the particular air interface standard used by each multichannel network. The TX channelizer banks 23, 24, 25 each receive the digitally processed and modulated digital channel signals associated with each particular air interface, be it CDMA, TDMA or GSM, from the corresponding set of baseband DSP units 20, 21, 22 and respectively combine these digital signals into a composite digital signal which is, in turn, supplied to a corresponding D-A converter 26, 27, 28 to be converted to an analog form. D-A converters 26, 27, 28 are coupled to corresponding wideband transmitters 16, 17, 18 to upconvert the composite analog signals to the appropriate RF frequency band. These composite analog signals are combined in the RF combiner 105 and supplied to the transmit antenna 19 for transmission.

Figure 2:
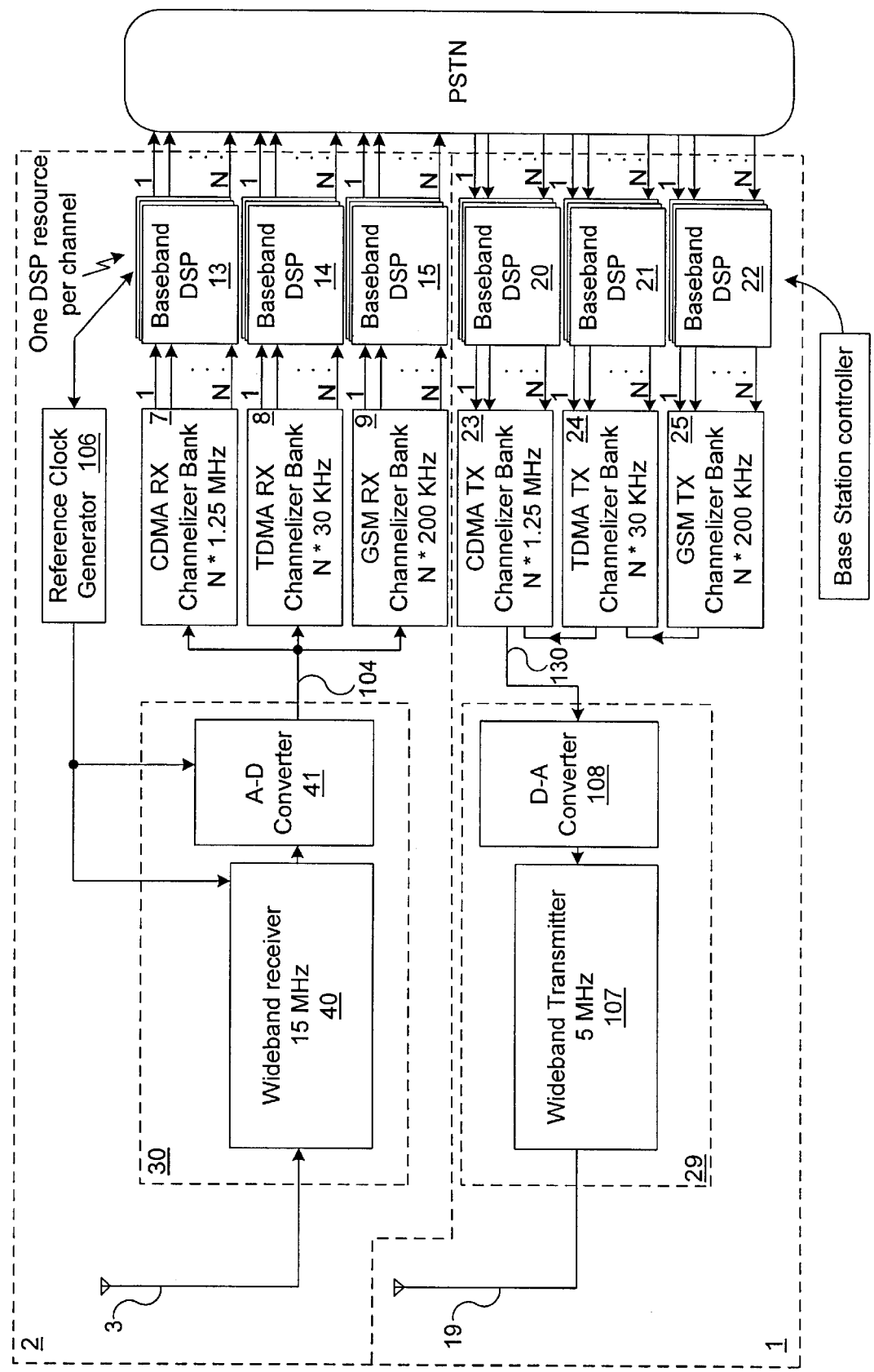
FIG. 2 is a block diagram of a transceiver portion which supports multiple air interface standards according to an embodiment of the invention.

Referring now to FIG. 2, a basestation transceiver, according to an embodiment of the invention which services CDMA, TDMA and GSM air interface standards and more particularly J-STD-008 CDMA, IS-136A TDMA and J-STD-007A GSM (thereafter simply referred to as CDMA, TDMA and GSM) at 1900 MHz has a receive section generally indicated by 2 and a transmit section generally indicated by 1. The receive section 2 has a receive antenna 3, an RF front end receive section 30, multiple RX channelizer banks 7, 8, 9 which are coupled to baseband DSP units 13, 14, 15 in a manner identical to that described above in reference to FIG. 1. The receive section 2 also has a reference clock generator 106 coupled between the RF front end receive section 30 and the baseband DSP units 13, 14, 15.

Figure 3:
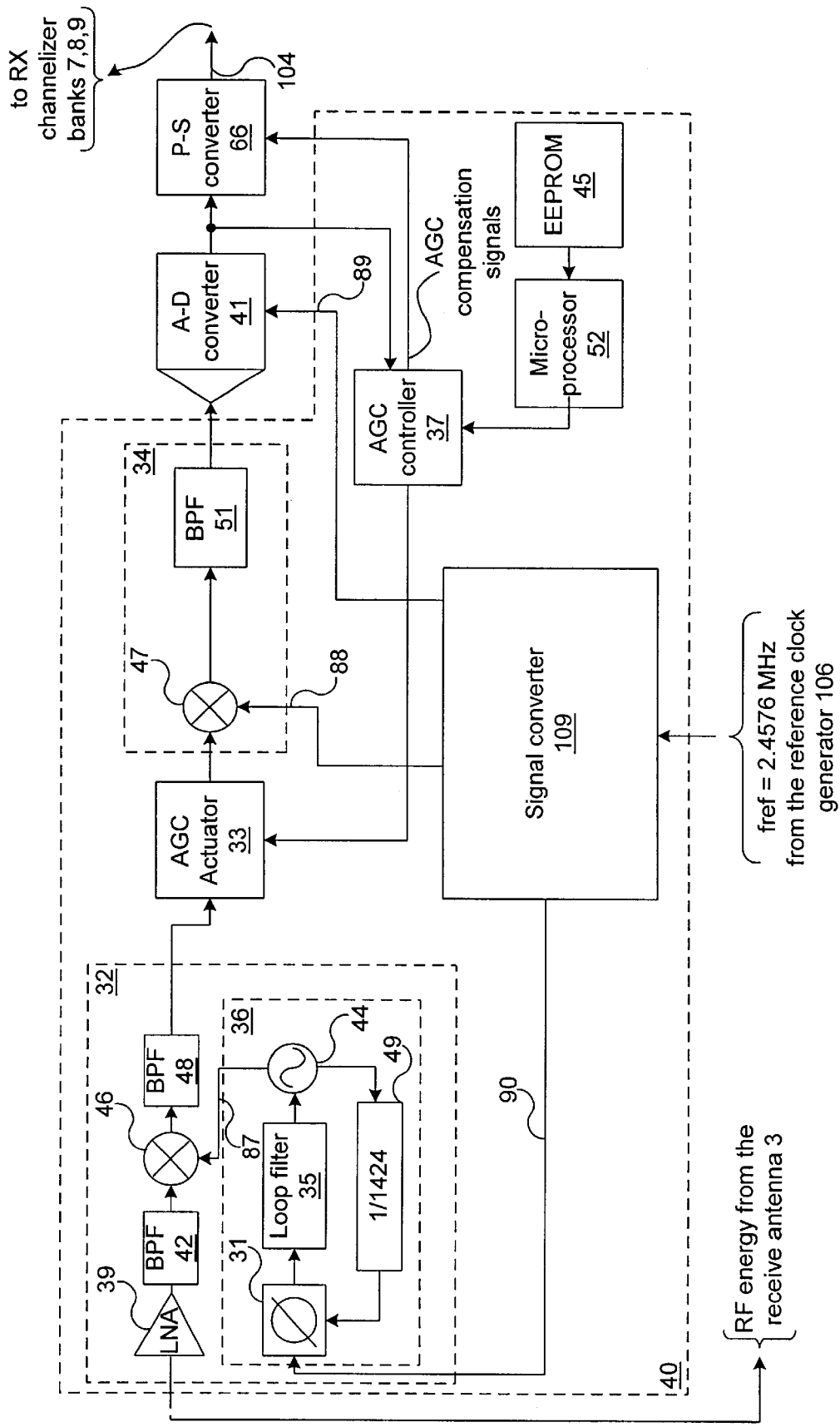
FIG. 3 is a block diagram of the RF front end receive section of the transceiver portion illustrated in FIG. 2.

Preferably, the RF front end receive section 30 is installed on or near the receive antenna 3 with a high speed optical link 104 connecting it to the remainder of the receive section 2 which would be typically installed on the ground near the base of the antenna tower. The RF front end receive section 30 is comprised of a single wideband receiver 40 and a single A-D converter 41 and will now be described in further detail with reference to FIG. 3.

The wideband receiver 40 is connected to the A-D converter 41 and has an RF analog receiver and downconverter unit generally indicated by 32 for connection to the receive antenna of FIG. 2. The RF analog receiver and downconverter unit 32 has a low noise amplifier 39 coupled to a first band pass filter 42 which is, in turn, coupled to an RF-IF (radio frequency-to-intermediate frequency) mixer 46. The RF-IF mixer 46 has an associated RF local oscillator signal 87 derived from a common reference clock signal, Fref, which is generated by the reference clock generator 106 of FIG. 2. More specifically, the RF local oscillator signal 87 is obtained via a narrow loop bandwidth PLL (phase-locked loop) generally indicated by 36 as having a phase detector 31, a loop filter 35, a crystal VCO (voltage controlled oscillator) 44 and a frequency divider 49. The PLL 36 is connected in series with a signal converter 109 (further detailed later in reference to FIG. 4) which is external to the RF analog receiver and downconverter unit 32 and is connected to receive the common reference clock signal Fref from the reference clock generator 106.

The RF analog receiver and downconverter unit 32 further has a second band pass filter 48 coupled internally to the output of RF-IF mixer 46 and externally to the input of an AGC (automatic gain control) actuator 33. The output of the AGC actuator 33 is, in turn, coupled to an IF (intermediate frequency) downconverter generally indicated by 34 which includes an IF mixer 47 and a band pass filter 51. The IF mixer 47 has an associated IF local oscillator signal 88 also derived from Fref through the signal converter 109.

The IF downconverter 34 is coupled to the A-D converter 41 which receives a high frequency digitizing clock signal (hereinafter referred to as the common digitizing clock signal) 89 derived from Fref also through the signal converter 109. The A-D converter 41 is connected to a P-S (parallel-to-serial) converter 66 which, in turn, is coupled to the RX channelizer banks 7, 8, 9 via the high speed optical link 104 (see FIG. 2) and also back to the AGC actuator 33 through an AGC controller unit 37 to form an AGC feedback loop. The AGC controller unit 37 is also coupled to the RX channelizer banks 7, 8, 9, and is connected to receive AGC loop control signals from a micro-processor 52 which has its input coupled to an EEPROM (electrically erasable programmable read-only memory) unit 45.

In operation, the RF front end receive section 30 obtains RF energy collected by the receive antenna 3 and couples it to the RF analog receiver and downconverter unit 32 which uses the band pass filter 42 to select a band of RF energy from the incoming signal pre-amplified in the low noise amplifier 39. The RF band must be large enough to contain the contents of the signals employing any one of the air interface standards supported. To service CDMA, TDMA and GSM channel signals for example, the RF analog receiver and downconverter unit 32 (which can be for example an off-shelf part such as the SR1019 dual channel down receiver manufactured by Watkins-Johnson) selects a 15 MHz frequency band from the frequency spectrum allocated for US PCS (United States Personal Communication System) operations. In this embodiment, the RF analog receiver and downconverter unit 32 selects the 15 MHz band extending from 1850 MHz to 1865 MHz. The pre-amplified RF band thus selected is downconverted to a first IF band by the combined operation of RF-IF mixer 46 and band pass filter 48. As an example, the RF analog receiver and downconverter unit 32 of FIG. 3 may downconvert the 15 MHz RF band centered at 1857.5 MHz to a first IF band centered at 108 MHz using the RF local oscillator signal 87 with a frequency of 1749.8112 MHz and supply the downconverted signal to the AGC actuator 33. The 1749.8112 MHz RF local oscillator signal 87 is derived from the common reference signal, Fref, through the signal converter 109 and the PLL 36. In order to generate this RF local oscillator signal 87, the signal converter 109 (further detailed below in reference to FIG. 4) functions to receive Fref which is assumed to be 2.4576 MHz for reasons explained below and produce an output signal 90 with a frequency of 1.2288 MHz. This output signal 90 is coupled to the PLL 36 which operates to generate the desired 1749.8112 MHz RF local oscillator signal 87 with a 1/1424 frequency divider 49.

The AGC actuator 33 is also described below in greater detail but may be now briefly described as adjusting the gain of the incoming downconverted signal according to the AGC control parameters it receives from the AGC controller unit 37. The IF downconverter 34 uses mixer 47 and band pass filter 51 to downconvert the output of the AGC actuator 33 to a second IF band, preferably extending from 3 MHz to 18 MHz and centered at 10.5 MHz. This downconversion example is effected by the use of the IF local oscillator signal 88 operating at a frequency of 117.9648 MHz directly obtained and derived from the 2.4576 MHz Fref through the signal converter 109.

The output of band-pass filter 51 is a down-converted, multichannel signal with a frequency content located in the 3 MHz to 18 MHz range. This signal holds the contents of the 1.25 MHz, 30 KHz and 200 KHz voice/data channels available in the communication systems of interest and is digitized in the A-D converter 41 (which may be, for example, the high speed 12 bit AD9042 manufactured by Analog Devices). As noted above, the A-D converter 41 uses the common digitizing clock signal 89 which is derived from Fref through the signal converter 109. The digitizing rate of the A-D converter 41 preferably set for this example to 63.8976 MHz is carefully selected, as described in detail below, to eliminate the need for additional expensive and complex signal filtering and shielding that would otherwise be required in the RX channelizer banks 7, 8, 9 for simultaneously processing the digitized signal received by the A-D converter 41 at the common digitizing rate based on their respective CDMA, TDMA and GSM requirements.

Figure 4:
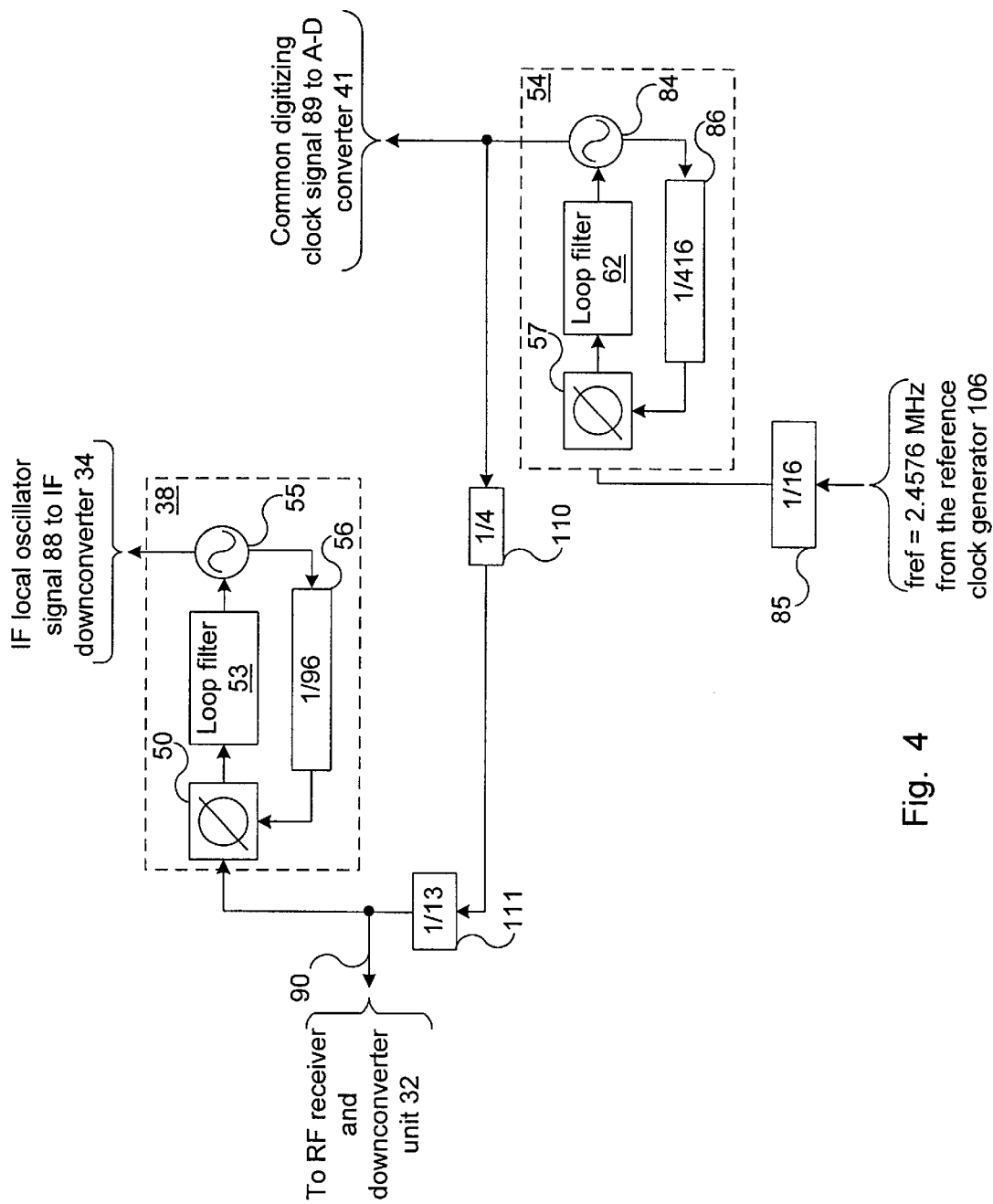
FIG. 4 is a block diagram of the signal converter of the RF front end receive section of FIG. 3.

The following section will now describe in detail and with reference to FIG. 4 the signal converter 109 through which the RF local oscillator signal 87 (see FIG. 3), the IF local oscillator signal 88 and the common digitizing clock signal 89 are derived from Fref. This will be followed by a complete description of the method used to generate Fref for a basestation supporting CDMA, TDMA and GSM air interface standards and with reference to the clock generator 106 illustrated in FIG. 5.

Referring firstly to FIG. 4, the signal converter 109 functions to receive the 2.4576 MHz Fref from the reference clock generator 106 for providing the RF analog receiver and downconverter unit 32, the IF downconverter 34 and the A-D converter 41 with respective output signal 90, IF local oscillator signal 88 and common digitizing clock signal 89.

More specifically, the signal converter 109 has a frequency divider 85 coupled to the reference clock generator 106 for receiving the Fref signal. This frequency divider 85 is connected to a narrow loop bandwidth PLL generally indicated by 54 which supplies the common digitizing clock signal 89 to the A-D converter 41. The PLL 54 has a phase detector 57, a loop filter 62, a crystal VCO 84 and a frequency divider 86. The output of the PLL 54 is also coupled externally to a pair of frequency dividers 110, 111 to produce the output signal 90 for the RF analog receiver and downconverter unit 32 This output signal 90 is also fed internally to a PLL 38 for producing the IF local oscillator signal 88 to the IF downconverter 34. Similarly to the PLL 54, the PLL 38 has a phase detector 50, a loop filter 53, a crystal VCO 55 and a frequency divider 56. It is to be noted however that as the phase noise has been virtually eliminated by the PLL 54, the lock-acquisition time of subsequent PLLs 36 and 38 is preferably improved by operating therein a loop bandwidth wider than that of the PLL 54.

In operation, the signal converter 109 functions to receive the 2.4576 MHz Fref signal from the reference clock generator 106 for providing the RF analog receiver and downconverter unit 32, the IF downconverter 34 and the A-D converter 41 with respective output signal 90, IF local oscillator signal 88 and common digitizing clock signal 89. More specifically, the output signal 90 supplied to the RF analog receiver and downconverter unit 32 is obtained from Fref through the frequency dividers 85, 110, 111 and PLL 54. The IF local oscillator signal 88 supplied to the IF downconverter 34 is produced with PLLs 54, 38 and frequency dividers 85, 110 and 111 while the common digitizing clock signal 89 is obtained from Fref through the frequency divider 85 and PLL 54.

In this example, the frequency of signal Fref=2.4576 MHz is initially divided by 16 in the frequency divider 85 and subsequently multiplied by a factor of 416 by the PLL 54 with a 1/416 frequency divider 86 to produce the 63.8976 MHz digitizing clock signal required for the A-D converter 41 (the selection of this particular frequency is further discussed below). The output of PLL 54 is consecutively divided further in the frequency dividers 110, 111 by respective factors of 4 and 13 to produce the 1.2288 MHz output clock signal 90 which is supplied to the RF analog receiver and downconverter unit 32. The 1.2288 MHz signal is also applied to PLL 38 for producing the 117.9648 MHz IF local oscillator signal 88 required by the IF downconverter 34 with a frequency divider 56 which has a divider of 1/96.

Figure 5:
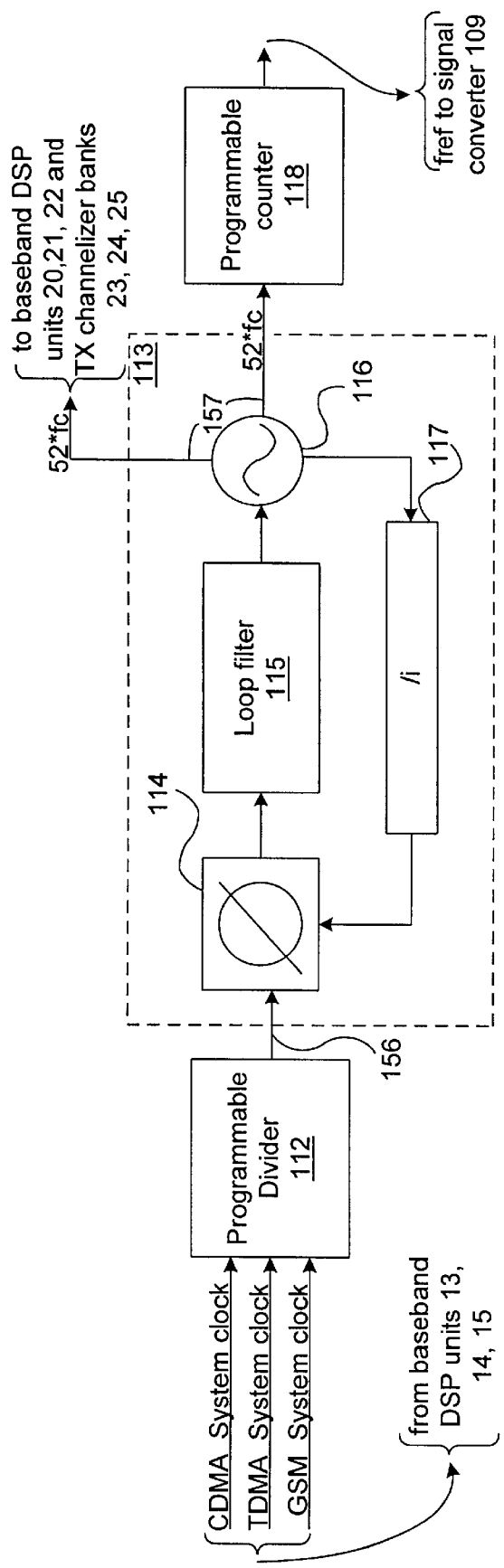
FIG. 5 is a block diagram of the reference clock generator of the transceiver portion of FIG. 2.

Referring to FIG. 5, the method used to select, generate and obtain the common reference signal, Fref, for a basestation supporting CDMA, TDMA and GSM air interface standards will now be described in relation to the reference clock generator 106.

The reference clock generator 106 operates to receive the CDMA, TDMA and GSM system clocks from respective sets of baseband DSP units 13, 14, 15 for producing Fref, and supplying it to the signal converter 109. The reference clock generator 106 is preferably located near the baseband DSP units 13, 14, 15, 20, 21, 22 and has a programmable divider 112 connected to receive the CDMA, TDMA and GSM system clocks. The programmable divider 112 supplies its output signal 156 to a PLL generally indicated by 113 which has a phase detector 114, a loop filter 115, a crystal VCO 116 and a programmable frequency divider 117. The PLL 113 is externally coupled to the basebands DSP units 20, 21, 22, to the TX channelizer banks 23, 24, 25 and is also coupled to the signal converter 109 (see FIG. 4) through a programmable counter 118.

In operation, the reference clock generator 106 functions to supply the common reference clock signal, Fref, to the signal converter 109 for deriving the RF and IF local oscillator signals and the common digitizing clock signal described above in reference to FIG. 3. Fref is generated from any of the CDMA, TDMA and GSM system clocks received from respective baseband DSP units 13, 14 and 15. As these system clock signals are derived from the baseband DSP units 13, 14 and 15, their respective frequency is dependent upon the corresponding baseband DSP signalling rate. As a result, Fref is selected to be derivable from any multiple of the system clocks. As an example, the systems clock signals of the preferred embodiment respectively operate at the following frequencies:

CDMA system clock: 19 660 800 Hz
TDMA system clock: 6 220 800 Hz
GSM system clock : 26 000 000 Hz The common reference clock signal, Fref, is selected to be easily derivable from any of the above system clocks. As such, these systems clocks are applied to the programmable divider 112 which selects one system clock and divides it down to a frequency suited for the PLL 113. The programmable divider 112 of a basestation which supports CDMA, TDMA and GSM air interface standards may, for example, divide the associated system clocks as follows:

CDMA system clock: 19 660 800/512=38 400 Hz
TDMA system clock: 6 220 800/162=38 400 Hz
GSM system clock : 26 000 000/625=41 600 Hz The programmable divider 112 supplies its output signal 156 to the PLL 113 which has a mode of operation similar to that of PLLs 38 and 54 described above in reference to FIG. 4 and accordingly functions to receive the system clock initially selected and divided down in the above-described manner by the programmable divider 112 and produce the output signal 157. The loop bandwidth of the PLL 113 is such that the output signal 157 can be generated from any of the divided-down versions of the system clocks. Further, the frequency of the output signal 157 is dictated by the dividing factor, 1/i, programmed into the programmable frequency divider 117 which is preferably set such that the output signal 157 generated operates at the common digizing rate of 63.8976 MHz (the selection of which is further detailed below) independent of the frequency of the programmable divider output signal 156. Generating the output signal 157 at the common digitizing rate of 63.8976 MHz in close proximity of the baseband DSP units is particularly useful because it is used locally for signal synchronization in the transmit section 1 of FIG. 2 and more particularly in the baseband DSP units 20, 21 and 22 and TX channelizer banks 23, 24, 25.

The PLL output signal 157 is fed into the programmable counter 118 which functions to produce Fref with a frequency high enough to be easily handled by currently available PLLs. In this particular example, Fref is selected to be 2.4576 MHz as this frequency is well suited for the PLLs 36, 38, 54 located in the RF front end receive section 30 of FIG. 3. The 2.4576 MHz Fref signal is obtained with the programmable counter 118 by dividing the 63.8976 MHz clock signal 157 by a factor of 26.

Referring back to FIG. 3, the output of A-D converter 41 consists of a composite digital signal comprised of a plurality of parallel streams of digital pulses. This plurality of parallel streams of digital pulses is generated at the common digitizing rate and is coupled to a P-S (parallel-to-serial) converter 66 to be combined into a single stream of digital pulses for transmission to the RX channelizer banks 7, 8, 9 via a high speed optical link where the composite digital signal comprising a single stream of digital pulses is applied to an S-P (serial-to-parallel) converter 59 (further described in reference to FIG. 6) to be converted back into a plurality of parallel streams of digital pulses and subsequently applied to the RX channelizer banks 7, 8, 9. The operation of the S-P converter 59 and RX channelizer banks 7, 8, 9 is further detailed below with reference to FIGS. 6, 7 and 8.

The A-D converter 41 is also coupled to the AGC actuator 33 through the AGC controller unit 37 to form an AGC feedback loop so as to prevent clipping of the A-D converter 41 for high received mobile signal strengths. The AGC controller unit 37 ensures that the A-D converter 41 is, to the extent possible, operating within its dynamic range by continuously monitoring the digital samples it generates as they are generated by the A-D converter 41. The gain adjustment to be inserted by the AGC actuator 33 in the analog signal path is proportional to the average error between each digital sample with an amplitude greater than the A-D converter detection threshold and the detection threshold itself. The average error is calculated for a specified number of digital samples defining a sample window and is used to determine the gain attenuation to be inserted by the AGC actuator 33 for the duration of the next window of digital samples generated by the A-D converter 41. In other words, a new attenuation factor is calculated in the AGC controller 37 and effected in the AGC actuator 33 for each new sample window based on the average error observed in the previous sample window. The attenuation applied in the AGC actuator 33 of the RF front end receive section 30 is also signalled to the RX channelizer banks 7, 8, 9 or the baseband DSP units 13, 14, 15 and may consequently be un-applied therein by a corresponding digital compensation such that the channelized digital signals processed and demodulated by the baseband DSP units 13, 14, 15 are within a constant amplitude range independent of the AGC controller settings.

The serial digitized signal generated by the P-S converter 66 and comprised of a single stream of digital pulses is transmitted via the high speed optical link 104 (see FIG. 2) and received by an S-P (serial-to-parallel) converter 59 (described below with reference to FIG. 6) connected to the RX channelizer banks 7, 8, 9. The RX channelizer banks 7, 8, 9 are designed to tune and filter the S-P converter 59 output signal and adjust its sample rate to the DSP data rate specified by their corresponding air interface standard with a plurality of rate adjustment components which may be for example decimators, rational rate converters and interpolators. This sample rate adjustment enables each RX channelizer bank 7, 8, 9 to extract the plurality N of channelized digital signals from the received signal, all respectively with, for example, a 1.25 MHz bandwidth as specified by CDMA, a 30 KHz bandwidth as specified by TDMA and a 200 KHz bandwidth as specified by GSM.

Figure 6:
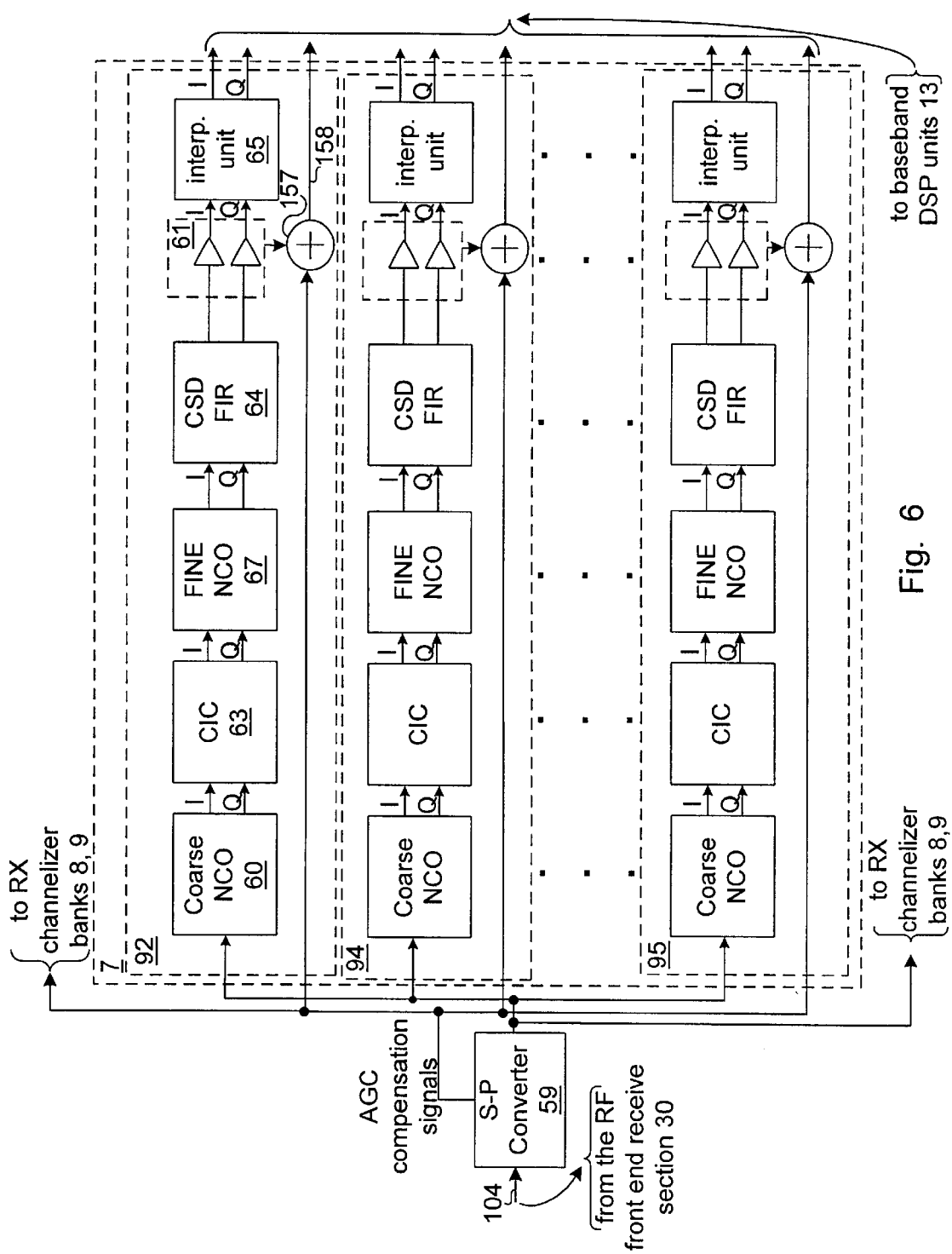
FIG. 6 is a block diagram of an example of a CDMA RX (receive) channelizer bank for use in the transceiver portion of FIG. 2.
Figure 7:
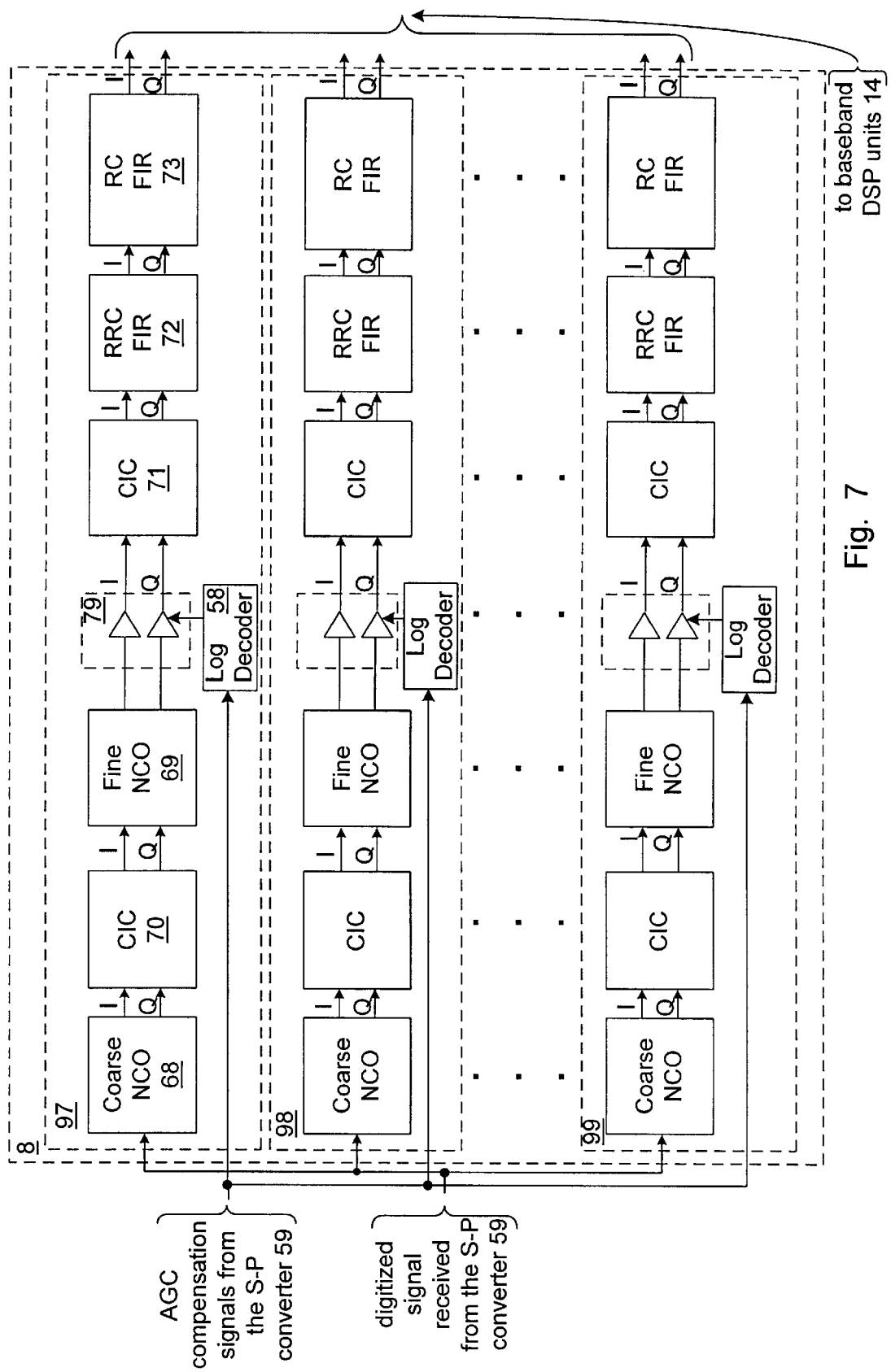
FIG. 7 is a block diagram of an example of a TDMA RX channelizer bank for use in the transceiver portion of FIG. 2.
Figure 8:
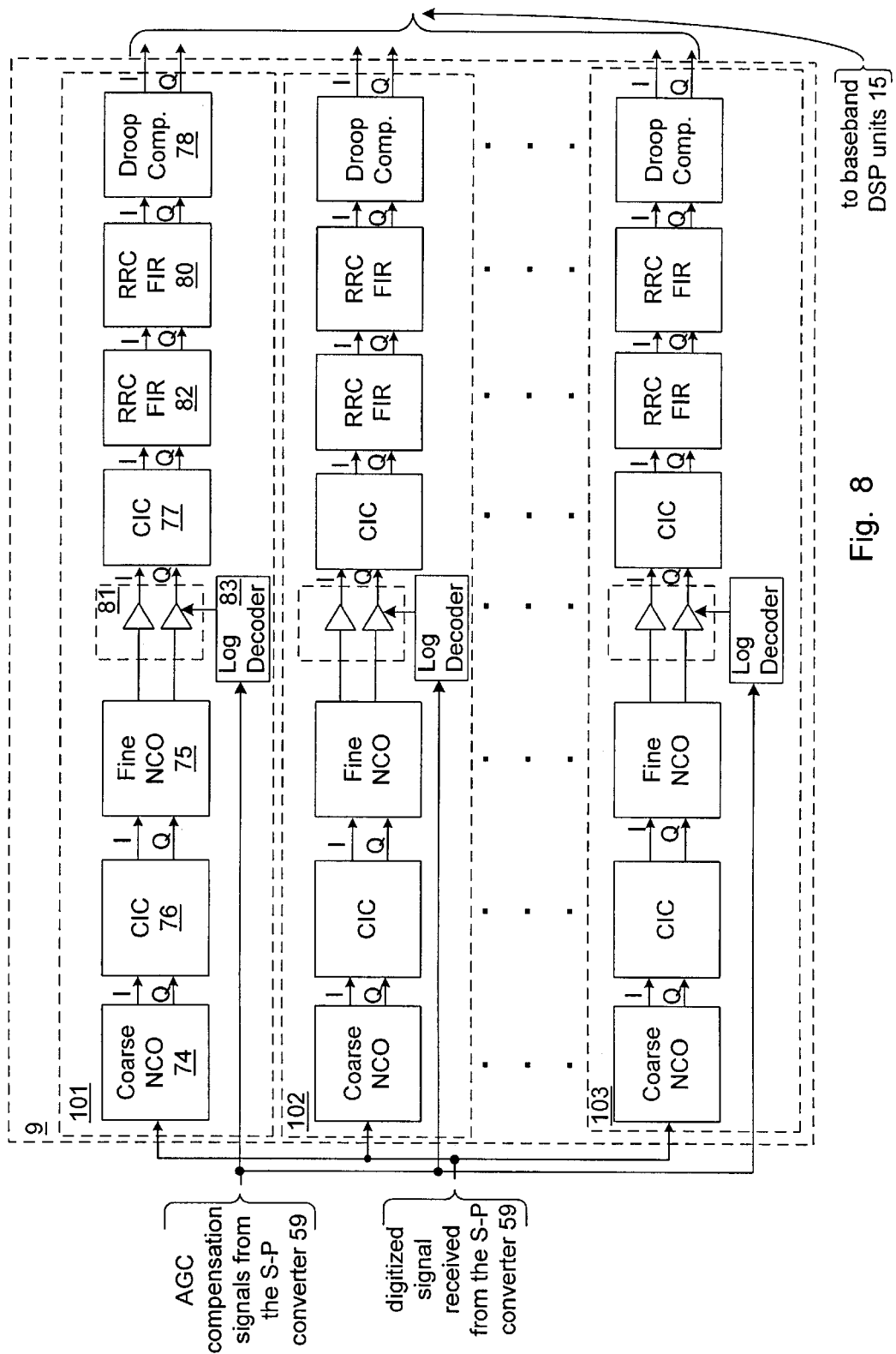
FIG. 8 is a block diagram of an example of a GSM RX channelizer bank for use in the transceiver portion of FIG. 2.

This section will now describe in detail and with reference to FIGS. 6, 7 and 8, the architecture of CDMA, TDMA and GSM RX channelizer banks 7, 8, 9 in accordance with the embodiment of the present invention. To begin, however, the method used to generate and obtain the above-referenced common digitizing rate of 63.8976 MHz for a basestation supporting CDMA, TDMA and GSM air interface standards is detailed, as this is required for an understanding of the description of the RX channelizer banks 7, 8, 9.

The common digitizing rate employed by A-D converter 41 is first selected in conformance to the Nyquist theorem fundamental sampling rule: 2*Fmax where Fmax=18 MHz is the upper frequency limit of the 15 MHz composite signal. The common digitizing rate must therefore be at least 36 MHz. Secondly, the common digitizing rate must be selected according to clock requirements specific to each air interface standard supported by the basestation which are, in this example, CDMA, TDMA and GSM air interface standards.

The following table contains in the first column all relevant air interface standards to be considered in the selection of the common digitizing rate for this embodiment. For this example, the corresponding DSP system rates are shown in their standard form in the second column and given in their prime factors in the third column:

TABLE 1

| Standard | System DSP rates (Hz) | Prime factors |
|---|---|---|
| CDMA | chip rate(fc): 1228800 | $(2^{14}) * (3) * (5^2)$ |
|  | system clock: 19660800 | $(2^{18}) * (3) * (5^2)$ |
| TDMA - D-AMPS | symbol rate: 24300 symbol rate | $(2^2) * (3^5) * (5^2)$ |

TABLE 1-continued

| Standard | System DSP rates (Hz) | Prime factors |
|---|---|---|
|  | multiple: 48600 | $(2^3) * (3^5) * (5^2)$ |
|  | system clock: 6220800 | $(2^{10}) * (3^5) * (5^2)$ |
| GSM | symbol rate: 270833.3 | $(2^7) * (5^6) * 13$ |
|  | System clock: 26000000 intermediate: 6500000 | $(2^5) * (5^6) * 13$ |

Concurrent processing by respective CDMA, TDMA and GSM multichannel networks of a digitized signal operating at a common digitizing rate necessitates some sample rate adjustment in the corresponding RX channelizer banks 7, 8, 9. The complexity and cost of such adjustment is proportional to the processing requirements of each RX channelizer bank 7, 8, 9. In any combination of air interface standards, one of the standards will require the most processing to convert the data rate of the incoming digitized signal to the desired DSP data rate and extract from this digitized signal the plurality N of channelized digital signals as specified by that particular air interface standard. This high processing demand has a direct bearing on the hardware complexity and cost of the corresponding RX channelizer bank. In order to reduce the overall hardware complexity and implementational costs associated with using a common digitizing rate, a third step consists of selecting a set of prime factors according to the figures contained in TABLE 1, for which the most processing intensive of the CDMA, TDMA and GSM multichannel networks can most easily be filtered and adjust its channelizer input data rate to meet its DSP data rate standard. This is preferably carried out by selecting all of the prime factors of the most processing intensive air interface standard to reduce the cost increase of the associated RX channelizer bank and therefore minimize the overall cost of the transceiver. If necessary, further factors may be successively added from other standards to ensure compliance with the Nyquist condition. However, the selection of such factors must also be carried out in consideration of the cost-related issues mentioned above.

In this example, analysis found that CDMA requires the most complex processing among the particular combination of CDMA TDMA and GSM air interface standards for similar filtering requirements as its associated channel bandwidth is greater than that of the TDMA and GSM air interface standards. Accordingly, all of its prime factors are selected. The CDMA prime factors $(2^{14})*(3)*(52)$ found in TABLE 1 above yield a digitizing rate of 1.2288 MHz. However, according to the Nyquist minimum sample rate of 36 MHz calculated above, this frequency is too low. To satisfy the Nyquist condition, an additional factor is selected from other standards. By inspection of the values contained in TABLE 1, 13 is the most appropriate factor to select among the TDMA and GSM prime factors, as the resulting rate adjustment to be implemented in the CDMA and TDMA RX channelizer banks 7, 8 is comparatively more cost-effective than the rate adjustment required if prime factors other than 13 are used. This factor of 13 from GSM is added to produce a common digitizing rate of 15974400 Hz which is also, according to the Nyquist criterion, too low. A further cost-effective factor of $(2^2)$ may be added to the factors in consideration to yield a sample rate of 63897600 Hz which amply satisfies the Nyquist condition. This digitizing rate is given in terms of its prime factors as $(2^{16})*(3)*(5^2)*13$ or can be expressed as a function of the CDMA chip rate, fc=1.2288 MHz as follows:

Common digitizing rate=52*fc

Therefore, a basestation which simultaneously supports CDMA, TDMA and GSM air interface standards in accordance with this example may use an A-D converter 41 with digitizing capabilities of 52*1.2288 MHz=63.8976 MHz.

As noted above, generating a digitized signal at the common digitizing rate of 52*fc requires some sample rate adjustment in the RX channelizer banks 7, 8, 9 for simultaneously processing the incoming digitized signal based on their respective CDMA, TDMA and GSM requirements. The input rate changes to effect for obtaining the desired DSP data rate expected by each RX channelizer bank 7, 8, 9 (see TABLE 1) are determined from the CDMA-based common digitizing rate (selected in the manner described above) by dividing it separately with the CDMA, TDMA and GSM clock rates in their prime number form. This operation is described below for each of the CDMA, TDMA and GSM air interface standards with reference to corresponding FIGS. 6, 7 and 8, and is followed, in each case, by a complete description of the associated CDMA, TDMA and GSM RX channelizer bank architecture.

Referring firstly to FIG. 6, the input rate change to be effected in the CDMA RX channelizer bank 7 to adjust the rate of the incoming digitized signal from 63.8976 MHz to the CDMA DSP receive data rate of (8*fc) or (8*1.2288 MHz) is determined by dividing the common digitizing rate with the CDMA DSP receive data rate in their prime number form as follows:

| | |
|---|---|
| common digitizing rate (52 * fc): | $(2^{16}) * (3) * (5^2) * 13$ |
| CDMA DSP receive data rate (8 * fc): | $(2^{17}) * (3) * (5^2)$ |
| CDMA rate adjustment (dividend): | 13/2 |

According to these figures, the CDMA input rate change is obtained by first decimating the incoming signal received at a rate of 52*fc by a factor of 13 and then interpolating it by a factor of 2. However, in order to reduce the number of digital operations to be performed therein and therefore obtain a more cost-effective implementation of the input rate change the incoming digitized signal received is preferably decimated further (provided this does not result in loss of signal information) before it is further processed in the CDMA RX channelizer bank 7. This additional decimation of the incoming digitized signal is compensated for by a corresponding interpolation to produce the required DSP data rate. As an example, the incoming signal received in the CDMA RX channelizer bank 7 is further decimated by a factor of 2 (in addition to the decimation of 13 calculated above) followed by an interpolation of 4 which results in an overal decimation of (13*2) followed by an interpolation of 4. This input rate change enables the CDMA RX channelizer bank 7 to take the composite signal obtained from the RF front end receive section 30 at the common digitizing rate of (52*fc) or 63.8976 MHz through the S-P converter 59 and extract from it a series of digital I (in-phase) and Q (quadrature) channel signals having the CDMA based sample rate of (8*fc). The CDMA RX channelizer bank 7 further operates to supply the I/Q channelized digital signals generated therein to the corresponding set of baseband DSP units 13 for further processing and demodulation.

More specifically, the CDMA RX channelizer bank 7 has a plurality, N, of CDMA RX channelizers (only three shown) generally indicated by 92, 94, 95. The CDMA RX channelizers 92, 94, 95 are each coupled externally to the output of the S-P converter 59. The CDMA RX channelizers 92, 94, 95 have an identical architecture and mode of operation and will now be described below with reference to a single CDMA RX channelizer 92.

The CDMA RX channelizer 92 of this example is coupled to receive the incoming digitized signal from the RF front end receive section 30 of FIG. 2 through the S-P converter 59. More specifically, the incoming digitized signal generated by the RF front end receive section 30 of FIG. 2 as a single stream of digital pulses is converted back into a plurality of streams of digital pulses. The CDMA RX channelizer 92 has a coarse-tune NCO (numerically controlled oscillator) unit 60 with an input coupled externally to the output of S-P converter 59 and with I/Q outputs supplied to a CIC (cascaded integrator comb) filter 63. The CDMA RX channelizer 92 also has a fine-tune NCO unit 67 where the respective I/Q outputs of the CIC filter 63 are coupled thereto. The fine-tune NCO 67 is, in turn, connected to a CSD FIR (canonic signed digit finite impulse response) filter 64. The CSD FIR filter 64 is coupled to a pair of digital compensators generally indicated by 61. The digital compensators 61 are coupled to an adder 157 which is also coupled to receive the AGC compensation signals from the RF front end receive section 30 for supplying a composite AGC signal 158 to the corresponding baseband DSP units 13. The outputs of digital compensators 61 are coupled to an interpolator unit 65 to produce a digital channel I/Q signal with the required CDMA DSP receive rate for further processing by the corresponding set of baseband DSP units 13.

In operation, the CDMA RX channelizer 92 is responsible for filtering and tuning the incoming digitized signal and adjusting its sample rate to meet the CDMA based sample rate of (8*fc) for extracting a single channelized digital signal in accordance with the CDMA air interface standard requirements.

More specifically, the incoming digitized signal is applied to the coarse-tune NCO unit 60 where it is initially separated into its I/Q signal components and coarsely tuned so as to align the desired signal's centre frequency to the CIC filter 63 for high rate decimation filtering. Fine tuning of the frequency of the incoming digitized signal is obtained with the fine-tune NCO unit 67 which operates to finely shift the spectrum of the digitized signal in frequency so as to match its associated centre frequency to that of the CSD FIR filter 64 for low rate decimation filtering. The CSD FIR filter 64 also operates to extract a single CDMA digital channel I/Q signal from the incoming digitized signal in accordance with the CDMA air interface standard and supply its respective I and Q components to the corresponding digital compensators 61. The digital compensators 61 respectively scale the I and Q signal components to 4 bits each as is required by the baseband DSP units 13. The scaling factor applied therein is combined in the adder 157 to the AGC compensation signals received from the RF front end receive section 30 of FIG. 2 for producing, the AGC composite signal 158. This AGC composite signal 158 is supplied to the corresponding set of baseband DSP units 13 for system level metrics and in particular, for cell breathing.

The sample rate of the CDMA digital channel 4 bit I/Q signal is further adjusted to obtain the desired CDMA DSP receive data rate of 8*fc by coupling the rescaled I/Q signals to the interpolation filter 65. For this example, the 52*fc digitized signal is processed through NCO units 60, 67 and decimated in CIC filter 63 and CSD FIR filter 64 with respective decimation factors of 13 and 2 calculated above for the CDMA air interface standard. The individual digital channel I/Q signal is extracted from the digitized signal according to the CDMA air interface standard and obtained via the output of the interpolation filter 65 where it is supplied therefrom to the corresponding set of baseband DSP units 13 for demodulation and further processing.

Referring now to FIG. 7, the TDMA input rate change is also determined by dividing the CDMA-based common digitizing rate of (52*fc) with the 48.6 KHz TDMA DSP rate expressed in their prime number form. The division is carried out as follows:

| | |
|---|---|
| common digitizing rate (52 * fc): | $(2^{16}) * (3) * (5^2) * 13$ |
| TDMA DSP data rate (48.6KHz): | $(2^3) * (3^5) * (5^2)$ |
| TDMA rate adjustment (dividend): | 26 * 8 *256/81 * 2 |

According to the above dividend, the TDMA rate change is obtained by decimating the incoming composite signal received from the RF front end receive section 30 at the common digitizing rate of (52*fc) or 63.8976 MHz by a factor of (26* 8*2) followed by a rational rate conversion of (81/256). This allows the TDMA RX channelizer bank 8 to receive the composite signal obtained at the common digitizing rate through the S-P converter 59 described above with reference to FIG. 4 and extract from it a series of digital I (in-phase) and Q (quadrature) channel signals having the TDMA DSP rate of 48.6 KHz. The I/Q channelized digital signals generated therein are supplied to the corresponding set of baseband DSP units 14 for further processing and demodulation. More specifically, the TDMA RX channelizer bank 8 has a plurality N of architecturally identical TDMA RX channelizers (only three shown) generally indicated by 97, 98, 99 which are coupled externally to the S-P converter 59. The TDMA RX channelizer bank 8 will now be described in relation to a single TDMA RX channelizer 97 in a manner similar to that used for describing the CDMA RX channelizer bank 7 above with reference to FIG. 6.

The TDMA RX channelizer 97 of this example has a coarse-tune NCO unit 68, a CIC filter 70 and a fine-tune NCO unit 69 connected together in sequence. In addition, the TDMA RX channelizer 97 has the fine-tune NCO unit 69 coupled to a pair of digital compensators generally indicated by 79 which are, in turn, coupled to receive the AGC compensation signals from the receive section of the front end 30 through a logarithmic decoder 58. The digital compensators 79 are coupled to a second CIC filter 71 which is, in turn, coupled an RRC (rational rate conversion) FIR filter 72. The TDMA RX channelizer 97 also has the RRC FIR filter 72 coupled to an RC (rate change) FIR filter 73 which is externally coupled to the corresponding set of baseband DSP units 14.

In operation, the TDMA RX channelizer 97 is responsible for responsible for filtering and tuning the incoming digitized signal and adjusting its sample rate to meet the TDMA DSP data rate of 48.6 KHz for extracting a single channelized digital signal in accordance with the TDMA air interface standard requirements.

More specifically, the desired frequency shift and TDMA DSP data rate of 48.6 KHz are obtained by first processing the incoming digitized signal through NCO units 68, 69 and CIC filters 70, 71 in a manner similar to that described above with reference to the CDMA RX channelizer 92 of FIG. 6. For this example, the 52*fc digitized signal is decimated in the CIC filters 70, 71 to respectively decimate by a high rate decimation factor of 26 and low rate decimation factor of 8 as calculated above for the TDMA air interface standard. The digitized signal is gain compensated with AGC compensation signals obtained from the received section of the RF front end 30 through the logarithmic decoder 58 and applied in the digital compensators 79. The digital compensation factor applied therein is selected to cancel out the attenuation inserted in the RF front end receive section 30 (which is described above in reference to FIG. 3) so as to make the attenuation transparent to the corresponding set of baseband DSP units 14. According to the decimation factors calculated above with reference to the TDMA air interface standard, the digitized signal is decimated further in the RRC FIR filter 72 with a rational rate conversion of (81/256) and also in the RC FIR filter 73 to operate the final decimation of 2 required to obtain the desired 48.6 KHz TDMA DSP data rate. The TDMA digital channel I/Q signal is extracted from the digitized signal according to the TDMA air interface standard and obtained via the output of the channel compensation FIR filter 73 to be supplied to the corresponding set of baseband DSP units 14 for further processing and demodulation.

Referring now to FIG. 8, the input rate change to be effected in the GSM RX channelizer bank 9 to adjust the rate of the incoming composite signal from 63.8976 MHz to the GSM DSP data rate of 541.666KHz is determined by dividing the CDMA-based common digitizing rate of (52*fc) with the 541.666 KHz GSM DSP rate expressed in their prime number form as follows:

| | |
|---|---|
| common digitizing rate (52 * fc): | $(2^{16}) * (3) * (5^2) * 13$ |
| GSM DSP data rate (541.666KHz): | $(2^2) * (5^6)/3 * 13$ |
| GSM rate adjustment (dividend): | 16 * 2 * 12/5 * 192/125 * 2 |

According to the above dividend, the GSM rate change is obtained by first decimating the incoming composite signal by a factor of (16*2) followed by two rational rate conversions, namely (5/12) and (125/192). This rate change enables the GSM RX channelizer bank 9 to take the composite signal obtained from the RF front end receive section 30 at the common digitizing rate of (52*fc) or 63.8976 MHz through the S-P converter 59 and extract from it a series of digital I (in-phase) and Q (quadrature) channel signals having the GSM DSP rate of 541.666 KHz. The I/Q channelized digital signals generated therein are supplied to the corresponding set of baseband DSP units 15 for further processing and demodulation. More specifically, the GSM RX channelizer bank 8 has a plurality N of architecturally identical GSM RX channelizers (only three shown) generally indicated by 101, 102, 103 and coupled externally to the S-P converter 59. The GSM RX channelizer bank 9 will now be described in relation to a single GSM RX channelizer 101 in a manner similar to that used for describing the TDMA RX channelizer bank 8 above with reference to FIG. 7.

The GSM RX channelizer 101 of this example has a coarse-tune NCO unit 74, a first CIC filter 76, a fine-tune NCO unit 75, digital compensators generally indicated by 81, a second CIC filter 77, a logarithmic decoder 83 and a first RRC FIR filter 82 all interconnected identically to the NCO units 68, 69, CIC filters 70, 71, digital compensators 79, the logarithmic decoder 58 and the RRC FIR filter 72 of the TDMA RX channelizer 97 described above with reference to FIG. 7. However, the GSM RX channelizer architecture differs from that of the TDMA RX channelizer 97 in that the GSM RX channelizer 101 has its first RRC FIR filter 82 coupled to a second RRC FIR filter 80. The RRC FIR filter 80 is, in turn, coupled to a droop compensator filter 78 which is connected externally to the corresponding set of baseband DSP units 15.

In operation, the GSM RX channelizer 101 of this example functions similarly to the TDMA RX channelizer 8 described above with reference to FIG. 7. In particular, the GSM RX channelizer 101 is also responsible for filtering and tuning the incoming digitized signal and adjusting its sample rate to meet the GSM DSP data rate of 541.666 KHz for extracting a channelized digital signal in accordance with the GSM air interface standard requirements. The GSM RX channelizer processes the (52*fc) digitized signal in NCO units 74, 75, CIC filters 76, 77 to respectively effect a high rate decimation filtering by a factor of 16 and a low rate decimation filtering by a factor of 2. The digitized signal is gain compensated with AGC compensation signals obtained from the RF front end receive section 30 through the logarithmic decoder 83 in a manner similar to that described above with reference to the TDMA RX channelizer 97 of FIG. 7. The desired GSM DSP data rate is obtained by further decimating the received signal with RRC FIR filters 82 and 80 by respective factors of (5/12) and (125/192) (see the decimation factors calculated above for the GSM air interface standard). The GSM digital channel I/Q signal is extracted from the digitized signal according to the GSM air interface standard and obtained via the output of the RRC FIR filter 80. The GSM digital channel I/Q signal is then droop compensated in the droop compensator filter 78 before being supplied to the corresponding set of baseband DSP units 15 for demodulation and further processing.

Referring now back to FIG. 2, the transmit section 1 of the basestation transceiver designed according to this invention has a plurality of sets of baseband DSP units 20, 21, 22 with each DSP unit coupled to the telephony network to receive one of a plurality of digital channel signals. These sets of DSP units 20, 21, 22 digitally process and modulate the digital channel signals received and are connected to respective CDMA, TDMA and GSM TX channelizer banks 23, 24, 25 which are connected in series to an RF front end transmit section generally indicated by 29 for producing a composite digital signal representative of the content of the digitally processed and modulated channel signals which can also be referred to as the CDMA digital channel signals, the TDMA digital channel signals and the GSM digital channel signals. The RF front end transmit section 29 has a single D-A converter 108 coupled to a single wideband transmitter 107 which is connected to a transmit antenna 19. The RF front end transmit section 29 is preferably installed on or near the transmit antenna 19 with a high speed optical link 130 connecting it with the remainder of the basestation to receive the composite signal and converting it into an analog form at a specified common D-A rate. This common D-A rate is selected to be the common digitizing rate of (52*fc) for reasons which are explained below. The resulting composite analog signal is then upconverted by the wideband transmitter 107 to the desired RF range before being transmitted via the transmit antenna 19.

The composite digital signal supplied to the D-A converter 108 is obtained by combining the CDMA, TDMA and GSM digital channel signals respectively processed by the CDMA TX channelizer bank 23, the TDMA TX channelizer bank 24 and the GSM TX channelizer bank 25. In order to combine these digital channel signals and simultaneously convert them to an analog form, their respective data rate must be converted to a common D-A rate. However, this requires sample rate adjustment in the TX channelizer banks 23, 24 25 and give rise to a number of considerations which must be taken into account in selecting a suitable common D-A rate. These considerations are the same as those discussed above in relation to the selection of a common digitizing rate and the method described thereafter is applicable here. As such, the common D-A rate is preferably selected to be equal to the common digitizing rate of (52*fc). Consequently, the CDMA, TDMA and GSM rate adjustment factors calculated above for converting the RX channelizer banks input rate of (52*fc) to the desired CDMA, TDMA and GSM DSP data rates can be used for determining the rate adjustment factors required for performing the reverse operation which consists of converting the rate of the CDMA, TDMA and GSM digital channel signals from their respective DSP data rate to the common digitizing rate of (52*fc). This approach is further described below for each of the CDMA, TDMA and GSM TX channelizer banks 23, 24, 25 with reference to FIGS. 9, 10 and 11.

Figure 9:
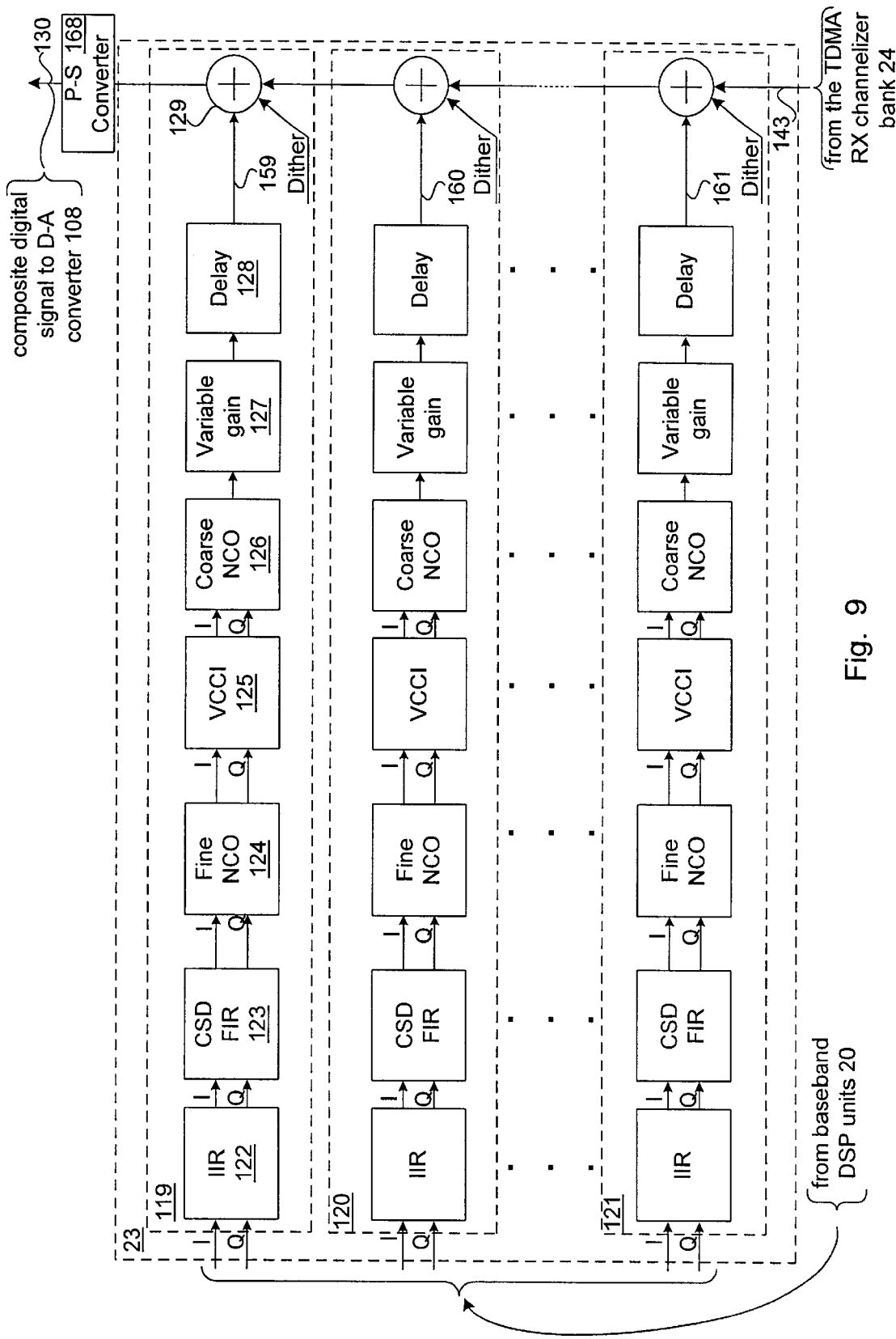
FIG. 9 is a block diagram of an example of a CDMA TX (transmit) channelizer bank for use in the transceiver portion of FIG. 2.

Referring firstly to FIG. 9, the rate change to be effected in the CDMA TX channelizer bank 23 to adjust the rate of the CDMA digital channel signals received from the corresponding baseband DSP units 20 at the CDMA DSP transmit data rate of (2*fc) to the common digitizing rate of (52*fc) is determined in relation to the rate adjustment factors calculated above for converting the CDMA RX channelizer bank input data rate from (52*fc) to (8*fc). In particular, for reducing the input data rate from (52*fc) to (2*fc), it can be observed that the CDMA RX channelizer bank 7 operates a decimation of (2*13). Based on this, the rate of the CDMA digital channel signals can be adjusted from (2*fc) to (52*fc) by interpolating each CDMA digital channel signal by a factor of 26 or (2*13). This enables the CDMA TX channelizer bank 23 to produce the CDMA digital channel signals at the (52*fc) rate and combine them with the TDMA and GSM digital channel signals also produced at the (52*fc) rate by respective TDMA and GSM combiners 24, 25 (further detailed below with reference to FIGS. 10 and 11) for generating the composite digital signal at the (52*fc) common digitizing rate.

More specifically, the CDMA TX channelizer bank 23 has a plurality, N, of CDMA TX channelizers (only three shown) generally indicated by 119, 120, 121 each coupled externally to one of the DSP units 20 to receive a CDMA digital channel signal for locating its respective frequency spectrum in the frequency band used for CDMA transmit operations and adjusting its data rate from the CDMA DSP transmit rate of (2*fc) to the common digitizing rate of (52*fc). The CDMA TX channelizers 119, 120, 121 are interconnected in a cascaded chain arrangement to digitally combine the adjusted CDMA digital channel signals 159, 160, 161 in cascade. To properly operate this cascaded digital channel combining, the CDMA TX channelizers 119, 120, 121 are synchronized to account for the propagation delay incurred by each CDMA digital channel signal 159, 160, 161 and in particular to account for the cumulative propagation delay experienced by the CDMA digital channel signals 159, 160, 161 as they are passed through successive adders on their way to the D-A converter 108. More particularly, the CDMA digital channel signals 159, 160, 161 generated by the CDMA TX channelizers 119, 120, 121 are combined in time synchronization with the CDMA digital channel signal 159 delayed more than the CDMA digital channel signal 160 which is itself delayed more than the CDMA digital channel signal 161.

The CDMA TX channelizers 119, 120, 121 are also cascaded with the TDMA TX channelizer bank 24 for combining the CDMA digital channel signals 159, 160, 161 with the TDMA and GSM digital channel signals respectively produced by the TDMA and GSM TX channelizer banks 24, 25 and received via the output signal 143. More specifically, this output signal 143 is representative of the content of the TDMA and GSM digital channel signals respectively produced by the TDMA and the GSM TX channelizer banks 24, 25 as the TDMA TX channelizer bank 24 itself is cascaded with the GSM TX channelizer bank 25 (this is further explained below in reference to FIGS. 10 and 11). The TDMA TX channelizer bank output signal 143 is received in the CDMA TX channelizer 121 last in the CDMA chain for producing, in the CDMA TX channelizer 119 first in the CDMA chain, and through the P-S converter 168, the composite digital signal 130 which is representative of the content of the CDMA, TDMA and GSM digital channel signals.

The CDMA TX channelizers 119, 120, 121 have an identical architecture and similar mode of operation for each producing a CDMA digital channel signal at the common digitizing rate of (52*fc) and combining it with other CDMA, TDMA and GSM digital channel signals in the manner describe above. As such, only the CDMA TX channelizer 119 will now be described.

The CDMA TX channelizer 119 has an IIR (infinite impulse response) filter 122 coupled to receive a CDMA digital channel I/Q signal from the corresponding baseband DSP units 20. The I/Q outputs of the IIR filter 122 are coupled to a CSD FIR filter 123 which is coupled to a fine-tune NCO unit 124. The fine-tune NCO unit 124 supplies its I/Q outputs to a VCCI (variable cascaded comb integrator) 125 which is connected to a coarse-tune NCO 126. The CDMA TX channelizer 119 also has a programmable delay 128 coupled to receive the real output of the coarse-tune NCO 126 through a variable gain unit 127 for producing the CDMA digital channel signal 159 having the common digitizing rate of 52*fc. The CDMA digital channel signal 159 is fed into a channel adder 129 where it is combined with a dither signal and the output signal of the preceding CDMA TX channelizer 120 to produce the composite digital signal 130 for the D-A converter 108 through a P-S converter 168.

In operation, the CDMA TX channelizer 119 of this example receives the CDMA digital channel I/Q signal from the corresponding baseband DSP units 20 and functions to filter and shift its respective frequency spectrum into the frequency band specified for CDMA transmit operations and adjust its data rate from the CDMA DSP transmit rate of (2*fc) to the common digitizing rate of (52*fc). The CDMA TX channelizer 119 also operates to delay the CDMA digital channel signal 159 thus produced to synchronously combine it with the CDMA digital channel signals 160, 161 such that the CDMA propagation delays are equalized. The CDMA digital channel signals 159, 160, 161 are also combined with the TDMA and GSM digital channel signals respectively produced by the TDMA TX channelizer bank 24 and the GSM TX channelizer bank 25 of the cascaded chain arrangement for generating the composite digital signal 130.

More specifically, the CDMA digital channel I/Q signal received is initially applied to the I/Q inputs of the IIR filter 122 to be phase equalized. The CDMA digital channel I/Q signal is then processed in the CSD FIR filter 123 to be interpolated by a factor of 2 and have out of band suppression applied. This is followed in the fine-tune NCO unit 124 by a fine frequency shift of the frequency spectrum occupied by the CDMA digital channel I/Q signal. The CDMA digital channel I/Q signal is further interpolated in the VCCI 125 by a factor of 13 to effect the required interpolation of 26. The frequency shift required to locate the CDMA digital channel I/Q signal in the frequency band used for CDMA transmit operations is completed with a wideband frequency shift operated by the coarse-tune NCO unit 126 for coarsely shifting the frequency spectrum of the CDMA digital I/Q signal. The coarse-tune NCO unit 126 also operates to digitally combine the I and Q signal components together and supply the resulting real signal to the variable gain unit 127 which is used to control the transmit power of its output signal. This output signal is then time delayed by the programmable delay 128 for aligning the CDMA digital channel signal 159 produced with the output signal of the preceding CDMA TX channelizer 120. These two signals are then digitally combined in the digital adder 129 at the common digitizing rate together with the dither signal which is used to improve the performance of the D-A converter 108 (further described below in reference to FIG. 12) by randomizing the quantization errors introduced therein. Typically, only one dither signal needs to be on in the CDMA TX channelizer bank 23 and is added out of band so as to prevent degradation of the desired signals. The digital adder 129 produces, through the P-S converter 168, the composite digital signal 130 which is representative of the content of the CDMA, TDMA and GSM digital channel signals.

Figure 10:
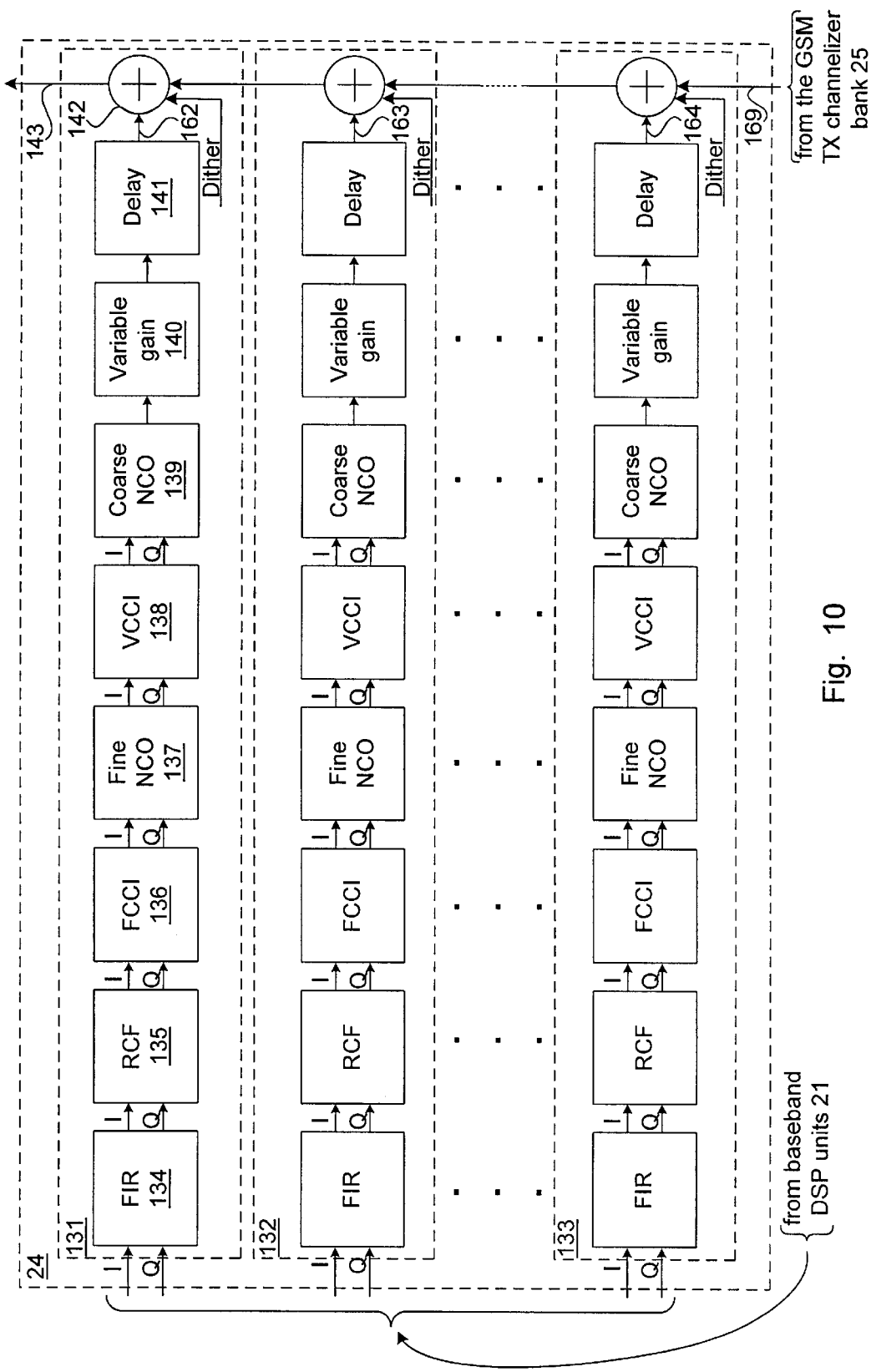
FIG. 10 is a block diagram of an example of a TDMA TX channelizer bank for use in the transceiver portion of FIG. 2.

Referring now to FIG. 10, the TDMA rate change to be effected in the TDMA TX channelizer bank 24 to adjust the rate of the TDMA digital channel signals received from the corresponding baseband DSP units 21 at the TDMA DSP data rate of 48.6 KHz to the common digitizing rate of (52*fc) is based on the rate adjustment factors calculated above for converting the TDMA RX channelizer bank input data rate from (52*fc) to 48.6 KHz. As noted before, this rate change is obtained by adjusting the TDMA RX channelizer bank input signal rate by (26*8*2*(81/256)) which corresponds to decimating the TDMA RX channelizer bank input signal by a factor of (26*8*2) or (16*26) followed by a rational rate conversion of (81/256). Based on this, the rate of the TDMA digital channel signals is adjusted in this example from 48.6 KHz to (52*fc) by interpolating each TDMA digital channel signal by a factor of (16*4*26) and operating a rational rate conversion of (64/81). This enables the TDMA TX channelizer bank 24 to produce the TDMA digital channel signals at the (52*fc) rate and combine them with the GSM digital channel signals received in the GSM TX channelizer bank 25 and also produced at the (52*fc) rate (further details below) for generating an output signal 143 having the (52*fc) common digitizing rate and representative of the content of the TDMA and GSM digital channel signals.

More particularly, the TDMA TX channelizer bank 24 has a plurality, N, of TDMA TX channelizers (only three shown) generally indicated by 131, 132, 133 each coupled externally to one of the DSP units 21 to receive a TDMA digital channel signal for locating its respective frequency spectrum in the frequency band used for TDMA transmit operations and adjusting its data rate from the TDMA DSP rate of 48.6 KHz to the common digitizing rate of (52*fc). The TDMA TX channelizers 131, 132, 133 are in time synchronization and are interconnected in a cascaded chain arrangement in a manner similar to that described above in relation with the CDMA TX channelizers 119, 120, 121 of FIG. 9, to digitally combine the adjusted TDMA digital channel signals 162, 163, 164 in cascade.

The TDMA TX channelizers 131, 132, 133 are also cascaded with the GSM TX channelizer bank 25 for combining the TDMA digital channel signals 162, 163, 164 with the GSM digital channel signals produced therein. More particularly, the GSM TX channelizer bank 25 generates an output signal 169 which is received in the TDMA TX channelizer 133 last in the TDMA chain for producing, in the TDMA TX channelizer 131 first in the TDMA chain, the output signal 143 representative of the content of the TDMA and GSM digital channel signals.

The TDMA TX channelizers 131, 132, 133 have an identical architecture and similar mode of operation for each producing a TDMA digital channel signal at the common digitizing rate of (52*fc) and combining it with other TDMA, CDMA, GSM digital channel signals in the manner describe above. As such, the TDMA TX channelizer bank 24 will now be described in relation to a single TDMA TX channelizer 131 in a manner similar to that used for describing the CDMA TX channelizer bank 23 with reference to FIG. 9.

The TDMA TX channelizer 131 has an FIR filter 134 coupled to receive a TDMA digital channel I/Q signal from the corresponding baseband DSP units 21. The I/Q outputs of the FIR filter 134 are coupled to an RCF (rate change filter) 135 which is coupled to a FCCI (fixed cascaded comb integrator) 136. The I/Q outputs of the FCCI 136 are supplied to a fine-tune NCO unit 137 which is followed by a VCCI 138, a coarse-tune NCO unit 139, a variable gain unit 140 and a programmable delay 141 connected together in sequence to produce the TDMA digital channel signal 162. The TDMA digital channel signal 162 is fed into a channel adder 142 where it is combined with a dither signal and the output signal of the preceding TDMA TX channelizer 132 to produce the output signal 143 for the CDMA TX channelizer bank 23.

In operation, the TDMA TX channelizer 131 of this example receives the TDMA digital channel I/Q signal from the corresponding baseband DSP units 21 and functions to filter and shift its respective frequency spectrum into the frequency band specified for TDMA transmit operations and adjust its data rate from the TDMA DSP transmit rate of 48.6 KHz to the common digitizing rate of (52*fc). The TDMA TX channelizer 131 also operates to delay the TDMA digital channel signal 162 to remain in time synchronization with the TDMA TX channelizers 132, 133. As noted above, this is required for synchronously combining the TDMA digital channel signals 162, 163, 164 such that the TDMA propagation delays are equalized. The TDMA digital channel signals 162, 163, 164 are also combined with the CDMA and GSM digital channel signals to produce, in the CDMA TX channelizer bank 23, the composite digital signal 130.

More specifically, the TDMA digital channel signal received is initially applied to the I/Q inputs of the FIR filter 134 to be interpolated by a factor of 16. The TDMA digital channel I/Q signal is then processed in the RCF 135 with a rational rate conversion of (64/81) and interpolated further in the FCCI 136 by a factor of 4. The frequency shift required to locate the TDMA digital channel I/Q signal in the frequency band used for TDMA transmit operations is finely and coarsely effected by respective fine-tune NCO unit 137 and coarse-tune NCO unit 139. The TDMA digital channel I/Q signal is further interpolated in the VCCI 138 by a factor of 26 to finalize the required TDMA rate change of (16*4*(64/81)*26) and obtain the desired (52*fc) data rate. The TDMA digital channel real signal is processed further in the variable gain unit 140 and the programmable delay 141 in a manner identical to that described above with respect to the CDMA TX channelizer 119 to adjust its transmit power and align the TDMA digital channel signal 162 produced with the output signal of the preceding TDMA TX channelizer 132. These signals are then digitally combined in the digital adder 129 at the common digitizing rate together with the dither signal for producing the output signal 143 which is representative of the content of the TDMA and GSM digital channel signals.

Figure 11:
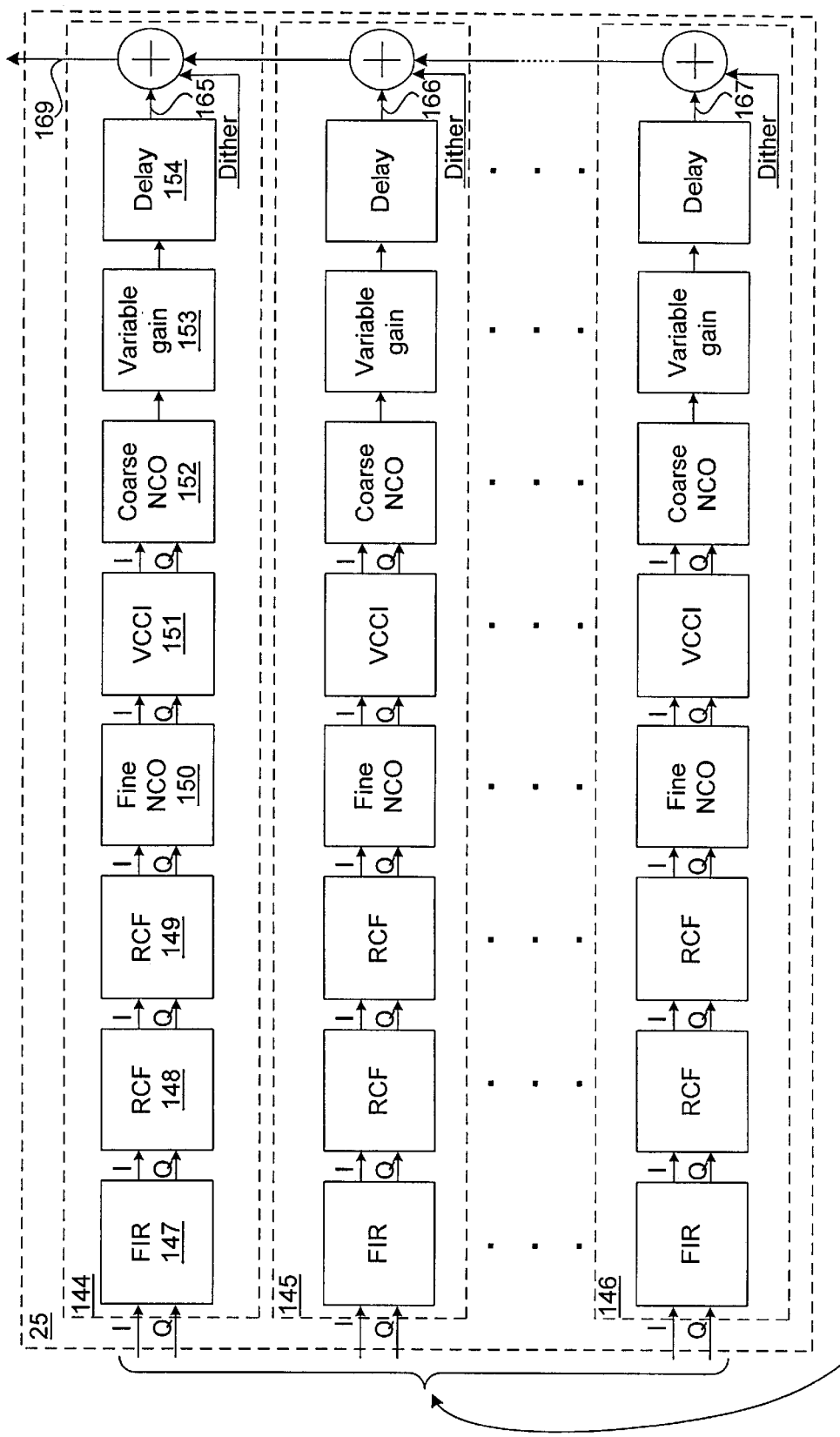
FIG. 11 is a block diagram of an example of a GSM TX channelizer bank for use in the transceiver portion of FIG. 2.

Referring now to FIG. 11, the GSM rate change to be effected in the GSM TX channelizer bank 25 to adjust the rate of the GSM digital channel signals received from the corresponding baseband DSP units 22 at the GSM DSP data rate of 541.666 KHz to the common digitizing rate of (52*fc) is based on the rate adjustment factors calculated above for converting the GSM RX channelizer bank input data rate from (52*fc) to 541.666 KHz. As noted before, this rate change is obtained by adjusting the GSM RX channelizer bank input signal rate by (16*2*(5/12)*(125/192)) which corresponds to decimating the GSM RX channelizer bank input signal by a factor of (16*2) followed by two rational rate conversions, namely (5/12) and (125/192). Based on this, the rate of the GSM digital channel signals is adjusted in this example from 541.666 KHz to (52*fc) by interpolating each GSM digital channel signal by a factor of (2*16) and operating two rational rate conversions of (12/5) and (192/125). This enables the GSM TX channelizer bank 25 to produce the GSM digital channel signals at the (52*fc) rate for generating the output signal 169 having the (52*fc) common digitizing rate and representative of the content of the GSM digital channel signals.

More particularly, the GSM TX channelizer bank 25 has a plurality, N, of GSM TX channelizers (only three shown) generally indicated by 144, 145, 146 each coupled externally to one of the DSP units 22 to receive a GSM digital channel signal for locating its respective frequency spectrum in the frequency band used for GSM transmit operations and adjusting its data rate from the GSM DSP rate of 541.666 KHz to the common digitizing rate of (52*fc). The GSM TX channelizers 144, 145, 146 are in time synchronization and are interconnected in a cascaded chain arrangement in a manner similar to that described above in relation with the TDMA TX channelizers 131, 132, 133 of FIG. 10, to digitally combine the GSM digital channel signals 165, 166, 167 in cascade.

The GSM TX channelizers 144, 145, 146 have an identical architecture and similar mode of operation for each producing a GSM digital channel signal at the common digitizing rate of (52*fc) and combining it with other CDMA, TDMA and GSM digital channel signals in the manner described above. As such, the GSM TX channelizer bank 24 will now be described in relation to a single GSM TX channelizer 144 in a manner similar to that used for describing the TDMA TX channelizer bank 23 with reference to FIG. 10.

The GSM TX channelizer 144 has an FIR filter 147 coupled to receive a GSM digital channel I/Q signal from the corresponding DSP units 22. The I/Q outputs of the FIR 147 are coupled to a first RCF 148 which is coupled to a second RCF 149. The GSM TX channelizer 144 also has a fine-tune NCO unit 150, a VCCI 151, a coarse-tune NCO unit 152, a variable gain unit 153, and a programmable delay 154 all interconnected identically to the NCO units 137, 139, the VCCI 138, the variable gain unit 140 and the programmable delay 141 of the TDMA TX channelizer 131 described above with reference to FIG. 10 for producing the output signal 169 to the TDMA TX channelizer bank 24.

In operation, the GSM TX channelizer 144 of this example receives the GSM digital channel I/Q signal from the corresponding baseband DSP unit 22 and functions to filter and shift its respective frequency spectrum into the frequency band specified for GSM transmit operations and adjust its data rate from the GSM DSP transmit rate of 541.666 KHz to the common digitizing rate of (52*fc). The GSM TX channelizer 144 also operates to delay the GSM digital channel signal 165 to remain in time synchronization with the GSM TX channelizers 145, 146. As noted above, this is required for synchronously combining the GSM digital channel signals 165, 166, 167 such that the GSM propagation delays are equalized. The GSM digital channel signals 165, 166, 167 are also combined with the CDMA and TDMA digital channel signals to produce, in the CDMA TX channelizer bank 23, the composite digital signal 130.

More particularly the GSM digital channel signal received is initially applied to the I/Q inputs of the FIR filter 147 to be interpolated by a factor of 2. The rational rate conversions of (12/5) and (192/125) are respectively operated in the first and second RCFs 148, 149. The GSM digital channel I/Q signal is further interpolated in the VCCI 151 by a factor of 16 to finalize the required GSM rate change of (2*16*(12/5)*(192/125)) and obtain the desired (52*fc) data rate. The frequency shift required to locate the GSM digital channel I/Q signal in the frequency band used for GSM transmit operations is finely and coarsely effected by respective fine-tune NCO unit 150 and coarse-tune NCO unit 152. The GSM digital channel I/Q signal is processed in the variable gain unit 153 and the programmable delay 154 in a manner identical to that described above with respect to the TDMA TX channelizer 131 for producing the GSM digital channel signal 165 with its transmit power adjusted and in digital alignment with the output signal of the preceding GSM TX channelizer 145. These two signals are then digitally added in the digital adder 145 at the common digitizing rate together with the dither signal for producing the output signal 169 representative of the content of the GSM digital channel signals.

Figure 12:
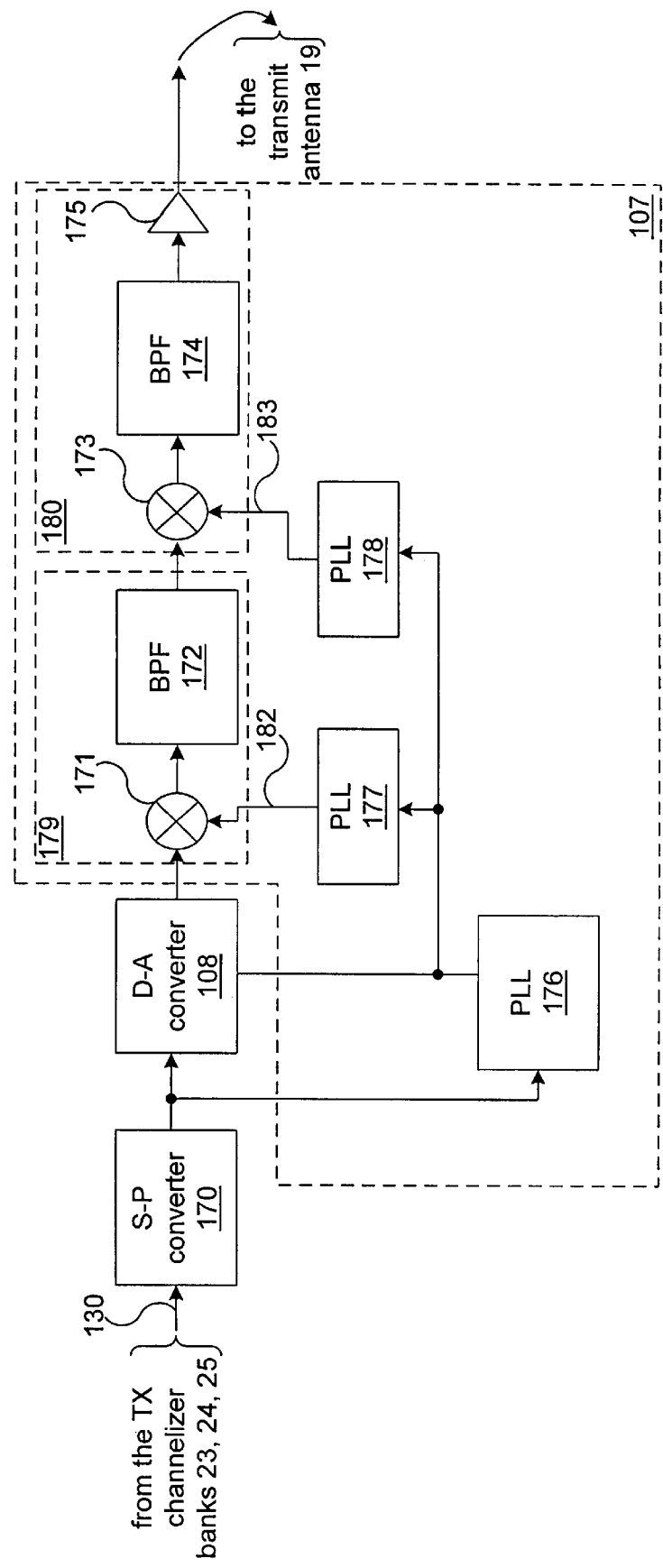
FIG. 12 is a block diagram of the RF front end transmit section of the transceiver portion illustrated in FIG. 2.

Referring now to FIG. 12, the RF front end transmit section 1 receives the composite digital signal 130 generated by the TX channelizer banks 23, 24, 25, converts it in the D-A converter 108 to an analog form and upconverts in the wideband transmitter 107 the resulting composite analog signal to the desired radio frequency range before transmitting it via the transmit antenna 19. More specifically, the D-A converter 108 is coupled to receive the composite digital signal 130 through the S-P converter 170. The output of the D-A converter 108 is supplied to an IF upconverter generally indicated by 179 which includes an IF mixer 171 and a band pass filter 172. The IF upconverter 179 is connected to an RF upconverter and analog transmitter generally indicated by 180 for connection to the transmit antenna 19 of FIG. 2. The RF upconverter and analog transmitter 180 has an IF-RF mixer 173 coupled to a band pass filter 174 which is connected to an amplifier 175.

The D-A converter 108, IF upconverter 179 and RF upconverter and analog transmitter 180 respectively derive their clock signal from the composite digital signal 130. More specifically, the D-A clock signal 181 is obtained via a PLL 176. The IF upconverter has an associated IF local oscillator signal 182 also derived through the PLL 176 and obtained with another PLL 177 connected in series with the PLL 176. The RF upconverter and analog transmitter 180 receives its associated RF local oscillator signal with a PLL 178 connected in series with the PLL 176.

In operation, the RF front end transmit section 1 receives the composite digital signal 130 generated by the TX channelizer banks 23, 24, 25, converts it in the D-A converter 108 at the common digitizing rate of (52*fc) to an analog form and upconverts in the wideband transmitter 107 the resulting composite analog signal to the RF band located in the 1930 MHz to 1990 MHz frequency range allocated for US PCS for downlink operations. The composite analog signal thus converted is then transmitted via the transmit antenna 19.

More particularly, the D-A converter 108 receives the composite digital signal 130 generated by the CDMA, TDMA and GSM TX channelizer banks 23, 24, 25 at the common digitizing rate of (52*fc) via the high speed optical link 104 (see FIG. 2) and through the S-P converter 170. The D-A converter 108 converts the composite digital signal 130 with the D-A clock signal 181 operating at the common digitizing rate of (52*fc) and derived through the PLL 176 which operates in a manner similar to the PLLs described above in reference to FIG. 4. The resulting composite analog signal has a bandwidth of 5 MHz and is fed to the IF upconverter 179 where it is upconverted to a first IF band extending from 110 MHz to 115 MHz with the IF local oscillator signal 182 set at 103.2192 MHz and also derived from the composite digital signal. The composite analog signal is further upconverted and amplified in the RF upconverter and analog transmitter 180 to the RF range allocated for US PCS downlink operations and extending from 1930 MHz to 1990 MHz. This upconversion is operated with the RF local oscillator signal 183 set to be in the 2040 MHz to 2105 MHz frequency range. The RF signal thus obtained is then supplied to the transmit antenna 19 for transmission.

While the common digitizing rate used by basestations of the present invention has been described above with reference to a particular set of air interface standards, further modifications and improvements to curtail the support to a subset of the air interface standards discussed above or to provide support for additional or different air interface standards which will occur to those skilled in the art, may be made within the purview of the appended claims, without departing from the scope of the invention in its broader aspect.

In particular, the common digitizing rate of the present invention has been selected in a manner described above to simultaneously support the CDMA, TDMA and GSM air interface standards. Furthermore, it is to be understood that a common digitizing rate other than 63.8976 MHz may be used to simultaneously handle CDMA, TDMA and GSM. As it becomes desirable to have more or different air interface standards simultaneously supported by basestations in accordance with this invention, it can be appreciated that a new digitizing rate will have to be calculated according to the method described therein.

Advantageously, the operational range of currently commercially available A-D and D-A converters such as the ones referenced above in relation to the RF front end receive and transmit sections are sufficient to handle the digitizing rate required to simultaneously accommodate CDMA, TDMA and GSM air interface standards. It can be further appreciated that a new common digitizing rate designated to support a particular set of air interface standards will have to be selected according to the present invention so as to be within the operational range of the A-D and D-A converters.

The selection of a new common digitizing rate will necessitate modifications in each RX channelizer bank which can be implemented in the manner prescribed therein to respectively adjust the data rate of the digitized signal received from the RF front end receive section at the new common digitizing rate to the DSP data rate standard specified by the corresponding air interface standard for extracting the channelized digital signals in accordance to each particular standard. It is to be understood that once a common digitizing rate is selected, the manner in which it is converted back to the proper rate for each standard is not unique. An example for CDMA, TDMA and GSM has been given, but different techniques may be employed.

Similarly, the TX channelizer banks will also have to be modified in the manner prescribed therein to respectively adjust the data rate of the digitally processed and modulated digital channel signals received from each set of baseband DSP units at the DSP data rate standard specified by the corresponding air interface standard to the new common digitizing rate for supplying the digital channel signals combined into a composite digital signal to the D-A converter at the new common digitizing rate. It is also to be understood that once a common digitizing rate is selected, the manner in which each rate is converted to the common digitizing rate is not unique. An example for CDMA, TDMA and GSM has been given, but different techniques may be employed. It can also be further appreciated that the new common digitizing rate designated to support a particular set of air interface standards will have to be selected in the manner prescribed therein so as to avoid any unnecessary complexity increase in the corresponding RX and TX channelizer banks.

Advantageously, the receive and transmit architectures of the basestation transceiver described above allow the support of diversity. Although the specific manner in which this can be implemented is beyond the scope of this invention, it can be appreciated that diversity can be achieved by simply replicating the entire signal path from the antenna to the DSP resources.

We claim:

1. A receive section for a multichannel wireless communication system for processing a composite RF (radio frequency) signal containing RF signals each having an RF bandwidth associated with a respective air interface standard, the receive section comprising:

a first antenna for receiving the composite RF signal;

a wideband receiver connected to the first antenna for down-converting the composite RF signal to produce a down-converted signal;

an A-D (analog-to-digital) converter connected to the wideband receiver for performing an analog-to-digital conversion on the down-converted signal to produce a first composite digital signal at a common digitizing rate;

for each particular air interface standard:

a) an associated RX (receive) channelizer bank connected to receive the first composite digital signal from the A-D converter for adjusting the first composite digital signal data rate to a corresponding standard DSP (digital signal processing) data rate specified by the associated air interface standard to produce a respective adjusted composite digital signal and for extracting from the respective adjusted composite digital signal a respective set of channelized digital signals; and b) a first set of DSP units connected to the RX channelizer bank for digitally processing and demodulating the corresponding set of channelized digital signals to produce a first set of digital channel signals each having an associated channel bandwidth corresponding to the particular air interface standard;

wherein the wideband receiver comprises an AGC (automatic gain control) circuit comprising:

a controller connected to the D-A converter to compare the D-A converter output to a predetermined reference level for providing a receiver gain setting; and an actuator for applying the receiver gain setting, the actuator having an input port for receiving the down-converted signal, a control port for receiving the gain control setting and an output port for providing a gain controlled down-converted signal to the A-D converter.

2. The receive section of claim 1 wherein for adjusting the first composite digital signal data rate, each RX channelizer bank comprises a plurality of rate adjustment components selected from the group of decimators, rational rate converters and interpolators connected to adjust the rate from the common digitizing rate to the corresponding standard DSP data rate.

3. The receive section of claim 2 in combination with a transmit section forming a transceiver, the transmit section processing multiple second sets of digital channel signals, each second set of digital channel signals being associated with a respective air interface standard, the transmit section comprises:

for each particular air interface standard:

a) a second set of DSP units each connected to receive the corresponding second set of digital channel signals for producing a respective set of digitally processed and modulated digital channel signals;

b) an associated TX (transmit) channelizer bank connected to receive the corresponding set of digitally processed and modulated digital channel signals, the TX channelizer banks being respectively operative to adjust the data rate of each digitally processed and modulated digital channel signal to the common digitizing rate for collectively producing a second composite digital signal at the common digitizing rate which is representative of the digitally processed and modulated digital channel signals;

a D-A (digital-to-analog) converter connected to receive the second composite digital signal for performing a digital-to-analog conversion on the second composite digital signal at the common digitizing rate to produce a composite analog signal;

a wideband transmitter connected to the D-A converter for up-converting the composite analog signal to produce an up-converted signal; and a second antenna for transmitting the up-converted signal.

4. The receive section of claim 3 wherein for adjusting the data rate of each digitally processed and modulated channel signal to the common digitizing rate, each TX channelizer bank comprises a plurality of rate adjustment components connected to adjust the rate from the corresponding standard DSP data rate to the common digitizing rate, the rate adjustment components being selected from the group of decimators, rational rate converters and interpolators.

5. The receive section of claim 4 wherein each TX channelizer bank further comprises a plurality of cascaded channel adders to combine in cascade the digitally processed and modulated digital channel signals respectively operating at the common digitizing rate for producing the second composite digital signal at the common digitizing rate.

6. The receive section of claim 5 wherein each TX channelizer bank further comprises a plurality of variable delays to synchronously combine in cascade the digitally processed and modulated digital channel signals for producing the second composite digital signal at the common digitizing rate.

7. The receive section of claim 6 wherein the second sets of digital channel signals processed by the multichannel communication system are received from respective ones of a plurality of multichannel networks, each multichannel network being respectively associated with a different air interface standard.

8. A transmit section for a multichannel wireless communication system for processing multiple sets of digital channel signals, each set of digital channel signals being associated with a respective air interface standard, the transmit section comprising:

for each particular air interface standard:
a) a set of DSP units each connected to receive the corresponding set of digital channel signals for providing a respective set of digitally processed and modulated channel signals;
b) an associated TX (transmit) channelizer bank connected to receive the corresponding set of digitally processed and modulated channel signals, the TX channelizer banks being respectively operative to adjust the data rate of each digitally processed and modulated channel signal received to the common digitizing rate for collectively producing a composite digital signal at the common digitizing rate which is representative of the digitally processed and modulated channel signals;
a D-A (digital-to-analog) converter connected to receive the composite digital signal for performing a digital-to-analog conversion on the composite digital signal at the common digitizing rate to produce a composite analog signal;
a wideband transmitter connected to the D-A converter for up-converting the composite analog signal to produce an up-converted signal; and
an antenna for transmitting the up-converted signal;
wherein for adjusting the data rate of each digitally processed and modulated channel signal to the common digitizing rate, each TX channelizer bank comprises a plurality of rate adjustment components connected to adjust the rate from the corresponding standard DSP data rate to the common digitizing rate, the rate adjustment components being selected from the group of decimators, rational rate converters and interpolators.

9. The transmit section of claim 8 wherein each TX channelizer bank further comprises a plurality of cascaded channel adders to combine in cascade the digitally processed and modulated channel signals respectively operating at the common digitizing rate for producing the composite digital signal at the common digitizing rate.

10. The receive section of claim 9 wherein each TX channelizer bank further comprises a plurality of variable delays to synchronously combine in cascade the digitally processed and modulated digital channel signals for producing the second composite digital signal at the common digitizing rate.

11. A method for a receive section in a multichannel wireless communication system to process a composite RF signal containing a plurality of RF signals each associated with a corresponding air interface standard, the method comprising the steps of:

receiving a band of radio frequencies containing the content of the composite RF signal;
down-converting the composite RF signal to produce a down-converted signal;
performing an analog-to-digital conversion on the down-converted signal to produce a composite digital signal at a common digitizing rate; and
for each air interface standard, adjusting the sample rate of the composite digital signal to a respective standard DSP data rate and extracting a set of digital channel signals from the adjusted composite digital signal;
wherein the common digitizing rate is selected as follows:
determining the lowest acceptable common digitizing rate based on the Nyquist theorem;
factoring each standard DSP data rate;
selecting the prime factors of the standard DSP data rate requiring the most processing;
for compliance with the Nyquist theorem, selecting further prime factors, if necessary, from the other standard DSP data rates; and
combining the selected prime factors to produce the common digitizing rate.

12. A method for a transmit section in a multichannel wireless communication system to process multiple sets of digital channel signals each associated with a corresponding air interface standard, the method comprising the steps of:

for each set of digital channel signals, adjusting the sample rate of each digital channel signal to a common digitizing rate;
combining the digital channel signals in cascade to produce a composite digital signal at the common digitizing rate; performing a digital-to-analog conversion at a common digitizing rate on the composite signal to produce a composite analog signal;
up-converting the composite analog signal to produce an up-converted signal; and
transmitting the content of the up-converted signal;
wherein the common digitizing rate is selected as follows:
determining the lowest acceptable common digitizing rate based on the Nyquist theorem;
factoring each standard DSP data rate;
selecting the prime factors of the standard DSP data rate requiring the most processing;
for compliance with the Nyquist theorem, selecting further prime factors, if necessary, from the other standard DSP data rates; and
combining the selected prime factors to produce the common digitizing rate.

* * * * *